(12) United States Patent
Alda

(10) Patent No.: US 11,222,172 B2
(45) Date of Patent: Jan. 11, 2022

(54) SYSTEM AND METHOD FOR REACTIVE COMPUTING

(71) Applicant: Lakebolt Research, Bethany, CT (US)

(72) Inventor: Enzo Alda, Bethany, CT (US)

(73) Assignee: Lakebolt Research, Bethany, CT (US)

( * ) Notice: Subject to any disclaimer, the term of this patent is extended or adjusted under 35 U.S.C. 154(b) by 35 days.

(21) Appl. No.: 15/987,845

(22) Filed: May 23, 2018

(65) Prior Publication Data

US 2019/0034400 A1 Jan. 31, 2019

Related U.S. Application Data

(60) Provisional application No. 62/507,807, filed on May 18, 2017.

(51) Int. Cl.
| | | |
|---|---|---|
| *G06F 17/00* | (2019.01) | |
| *G06F 40/18* | (2020.01) | |
| *G06F 9/54* | (2006.01) | |

(52) U.S. Cl.
CPC ............... *G06F 40/18* (2020.01); *G06F 9/54* (2013.01)

(58) Field of Classification Search
CPC ......... G06Q 10/06; G06F 40/18; G06F 30/20; G06F 9/54
See application file for complete search history.

(56) References Cited

U.S. PATENT DOCUMENTS

| | | | | |
|---|---|---|---|---|
| 2002/0059195 A1* | 5/2002 | Cras | ................... | G06F 16/283 |
| 2002/0059203 A1* | 5/2002 | Witkowski | ............ | G06F 16/244 |
| 2009/0312992 A1* | 12/2009 | Chen | ...................... | G06F 30/20 |
| | | | | 703/2 |
| 2012/0016910 A1* | 1/2012 | Schlarb | ................. | G06F 16/951 |
| | | | | 707/803 |
| 2012/0303924 A1* | 11/2012 | Ross | ...................... | G06F 21/62 |
| | | | | 711/170 |
| 2013/0298002 A1* | 11/2013 | Viry | ........................ | G06F 40/18 |
| | | | | 715/220 |
| 2014/0019948 A1* | 1/2014 | Goetz | .................... | G06F 8/437 |
| | | | | 717/143 |
| 2014/0304691 A1* | 10/2014 | Slavin | ...................... | G06F 8/31 |
| | | | | 717/140 |
| 2015/0193422 A1* | 7/2015 | Cudak | ................. | G06F 16/2455 |
| | | | | 715/219 |
| 2015/0378979 A1* | 12/2015 | Hirzel | .................... | G06F 40/18 |
| | | | | 715/220 |

OTHER PUBLICATIONS

"Array Formulas," Pearson Software Consulting, accessed at http://www.cpearson.com/excel/arrayformulas.aspx, accessed on Nov. 8, 2018, pp. 1-4.
"Drill down," last edited on Jan. 19, 2018, accessed at https://en.wikipedia.org/wiki/Drill_down, accessed on Nov. 8, 2018, p. 1.

(Continued)

*Primary Examiner* — Andrew T McIntosh
(74) *Attorney, Agent, or Firm* — Schott, P.C.

(57) ABSTRACT

A reactive spreadsheet in which the functionality of the reactive spreadsheet is decoupled from the visualization, where the same object or variable may appear in different tabs and panels while still retaining its identity.

23 Claims, 21 Drawing Sheets

(56) References Cited

OTHER PUBLICATIONS

"Excel Array Formulas," accessed at http://www.excelfunctions.net/Excel-Array-Formulas.html, accessed on Nov. 8, 2018, pp. 1-3.
"Functional reactive programming," last edited on Oct. 31, 2018, accessed at https://en.wikipedia.org/wiki/Functional_reactive_programming, accessed on Nov. 8, 2018, pp. 1-3.
"Gradual typing," last edited on Sep. 4, 2018, accessed at https://en.wikipedia.org/wiki/Gradual_typing, accessed on Nov. 8, 2018, pp. 1-3.
"Guidelines and examples of array formulas," Microsoft, accessed at https://support.office.com/en-us/article/Guidelines-and-examples-of-array-formulas-7D94A64E-3FF3-4686-9372-ECFD5CAA57C7, accessed on Nov. 8, 2018, pp. 1-24.
"Lambda calculus," last edited on Oct. 31, 2018, accessed at https://en.wikipedia.org/wiki/Lambda_calculus, accessed on Nov. 11, 2018, pp. 1-21.
"Lisp (programming language)," last edited on Nov. 3, 2018, accessed at https://en.wikipedia.org/wiki/Lisp_(programming_language), accessed on Nov. 8, 2018, pp. 1-19.
"Matrix (mathematics)," last edited on Nov. 6, 2018, accessed at https://en.wikipedia.org/wiki/Matrix_(mathematics), accessed on Nov. 8, 2018, pp. 1-20.
"Model-view-controller," last edited on Nov. 1, 2018, https://en.wikipedia.org/wiki/Model%E2%80%93view%E2%80%93controller, accessed on Nov. 8, 2018, pp. 1-4.
"Monte Carlo method," last edited at Nov. 6, 2018, accessed at https://en.wikipedia.org/wiki/Monte_Carlo_method, acessed on Nov. 8, 2018, pp. 1-18.
"Reacting To Real-Time Events With Functions," The growing importance of functional reactive computing, created on Aug. 18, 2018, p. 26.
"Smart Sheets," A new breed of spreadsheet computing, Lakebolt Research, A Brief History of Spreadsheets, created on Feb. 20, 2017, p. 30.
"THE multiprogramming system," last edited on Jan. 24, 2018, accessed at https://en.wikipedia.org/wiki/THE_multiprogramming_system, accessed on Nov. 8, 2018, pp. 1-2.
"Type system," last edited on Sep. 23, 2018, accessed at https://en.wikipedia.org/wiki/Type_system, accessed on Nov. 8, 2018, pp. 1-13.
"Uniform distribution (continuous)," last edited on Oct. 10, 2018, acessed at https://en.wikipedia.org/wiki/Uniform_distribution_(continuous), accessed on Nov. 8, 2018, pp. 1-7.
Abraham, R., and Erwig, M., "Type Inference for Spreadsheets," In Proceedings of the 8th International ACM SIGPLAN Conference on Principles and Practice of Declarative Programming, PPDP'06, Venice, Italy, pp. 73-84 (2006).
Alda, E., "Smart Sheets," A new breed of spreadsheet computing, Lakebolt Research, accessed at www.lakebolt.com, created on Mar. 28, 2015, p. 23.
Alda, E., and Figuera, M., "High performance Web Enabled Systems," An asynchronous, reactive, and data-driven, approach, Lakebolt Research, created on Mar. 18, 2016, p. 20.
Alda, E., and Figuera, M., "ZenSheet: a live programming environment for reactive computing," SPLASH'17, Vancouver, British Columbia, Canada, pp. 1-4 (2017).
Alda, E., et al., "Reactive Sheets," An intuitive approach to functional-reative computing, Lakebolt Research, created on May 18, 2017, p. 32.
Alda, E., et al., "Towards Wide-Spectrum Spreadsheet Computing," Blending spreadsheets and general programming languages, Lakebolt Research, Lanpar/Outcom, Created on Mar. 18, 2018, p. 36.
Barowy, D.W., et al., "CHECK-CELL: Data Debugging for Spreadsheets," OOPSLA, Portland, OR, USA, vol. 49, No. 10, pp. 507-523 (2014).
Clack, C., and Braine, L., "Object-Oriented Functional Spreadsheets," Department of Computer Science, University College London, Gower Street, London, UK, created on 2007, pp. 1-16 (1997).
Clermont, M., "Heuristics for the Automatic Identification of Irregularities in Spreadsheets," First Workshop on End-User Software Engineering (WEUSE I), pp. 1-6 (2005).
Figuera, M., "ZenSheet Studio: A Spreadsheet-Inspired Environment for Reactive Computing," SPLASH Companion'17, Proceedings Companion of the 2017 ACM SIGPLAN International Conference on Systems, Programming, Languages, and Applications: Software for Humanity, Vancouver, Canada, pp. 33-35 (2017).
Figuera, M., and Alda, E., "ZenSheet: A functional reactive environment for data modeling and real-time data processing," Lakebolt Research, Universidad Simon Bolivar, created on Jun. 3, 2016, p. 1.
Hanna, K., "A Document-Centered Environment for Haskell," IFL 2005, Implementation and Application of Functional Languages, LNCS, vol. 4015, pp. 196-211 (2006).
Hanna, K., "Interactive Visual Functional Programming," ICFP'02, Proceedings of the seventh ACM SIGPLAN International conference on Functional programming, pp. 145-156 (2002).
Hermans, F., et al., "Data Clone Detection and Visualization in Spreadsheets," Delft University of Technology Software Engineering Research Group Technical Report Series, Report TUD-SERG-2012-016, TUDelft, ICSE 2013, Proceedings of the 2013 International Conference on Software Engineering, San Francisco, CA, USA, pp. 292-301 (2013).
Hermans, F., "Gathering Domain Knowledge from Spreadsheets," ESEC/FSE Doctoral Symposium'09, Proceedings of the doctoral symposium for ESEC/FSE on Doctoral symposium, Amsterdam, The Netherlands, pp. 37-38 (2009).
Hermans, F., "Improving Spreadsheet Test Practices," Delft University of Technology, CASCON '13 Proceedings of the 2013 Conference of the Center for Advanced Studies on Collaborative Research, pp. 56-69 (2013).
Hermans, F., and Dig, D., "BumbleBee: A Refactoring Environment for Spreadsheet Formulas," FSE'14, Proceedings of the 22nd ACM SIGSOFT International Symposium on Foundations of Software Engineering, Hong Kong, China, pp. 747-750 (2014).
Hermans, F., et al., "2nd International Workshop on Software Engineering Methods in Spreadsheets (SEMS 2015)," 2015 IEEE/ACM 37th IEEE International Conference on Software Engineering, vol. 2, pp. 1005-1006 (2015).
Hermans, F., et al., "Detecting and Visualizing Inter-worksheet Smells in Spreadsheets," Software Engineering Research Group, ICSE '12 Proceedings of the 34th International Conference on Software Engineering, pp. 441-451 (2012).
Homer, M., and Noble, J., "Combining Tiled and Textual Views of Code," Second IEEE Working Conference on Software Visualisation (VISSOFT), pp. 1-10 (2014).
Hoon, W. A.C.A.J. DE, et al., "Implementing a Functional Spreadsheet in Clean," Journal of Functional Programming, pp. 1-21 (1995).
Joharizadeh, N., "Finding Bugs in Spreadsheets using Reference Counting," In Companion Proceedings of the 2015 ACM SIGPLAN International Conference on Systems, Programming, Languages and Applications: Software for Humanity, SPLASH Companion'15, Pittsburgh, PA, USA, pp. 73-74 (2015).
Jones, S. P., et al., "Spreadsheets: functional programming for the masses," Excell, pp. 1-37 (2014).
Jones, S.P., et al., "A User-Centred Approach to Functions in Excel," To appear at the International Conference on Functional Programming (ICFP'03), Uppsala, vol. 38, No. 9, pp. 165-176 (2003).
Lisper, B., and Malmstrom, J., "Haxcel: A Spreadsheet Interface to Haskell," Dept, of Computer Engineering, Malardalen University, SWEDEN, created on Oct. 23, 2002, pp. 206-222 (2002).
Scaffidi, C., et al., "Toped: Enabling End-User Programmers to Validate Data," CHI 2008 Proceedings • Works In Progress, Florence, Italy, pp. 3519-3524 (2008).
Wadler, P., "Why no one uses functional languages," ACM SIGPLAN Notices, Functional Programming, Bell Laboratories, Lucent Technologies, vol. 33, No. 8, pp. 23-27 (1998).
Wakeling, D., "Spreadsheet functional programming," Cambridge University Press, JFP, vol. 17, No. 1, pp. 131-143 (2007).

(56) References Cited

OTHER PUBLICATIONS

SESTOFT, P., "Implementing Function Spreadsheets," WEUSE '08 Proceedings of the 4th international workshop on End-user software engineering, pp. 91-94 (2008).

* cited by examiner

| | A | B | C | D | E |
|---|---|---|---|---|---|
| 0 | | | | | |
| 1 | x | ln(x) | sqrt(x) | square(x) | exp(x) |
| 2 | 2.058412781 | 0.721935191 | 1.434716969 | 4.237063176 | 7.8335264 |
| 3 | 2.635606758 | 0.969113424 | 1.623455191 | 6.946422981 | 13.9517752 |
| 4 | 3.771379481 | 1.327440845 | 1.942003986 | 14.223303187 | 43.4399480 |
| 5 | 4.537248016 | 1.512320664 | //SQRT(A5)// | 20.586619559 | 93.4333189 |
| 6 | 5.518877495 | 1.708174487 | 2.349229128 | 30.458008805 | 249.3549778 |
| 7 | 6.620488132 | 1.890169103 | 2.573030923 | 43.830863107 | 750.3112587 |

FIG. 4E

| | A | B | C | D | E |
|---|---|---|---|---|---|
| 0 | | | | | |
| 1 | x | ln(x) | sqrt(x) | square(x) | exp(x) |
| 2 | 2.118359770 | 0.750642096 | 1.455458612 | 4.487448115 | 8.3174837 |
| 3 | 2.803796924 | 1.309735517 | 1.674454217 | 7.861277189 | 16.5072045 |
| 4 | 3.910774816 | 1.363735517 | 1.977567904 | 15.294159662 | 49.9376294 |
| 5 | 4.633051944 | 1.533215818 | 2.152452542 | 21.465170317 | 102.827409 |
| 6 | 6.061167355 | 1.801902414 | 2.461943816 | //SQRT(A6)// | 428.875795 |
| 7 | 6.830800530 | 1.921441875 | 2.613580022 | 46.659835885 | 925.931752 |

| | A | B | C | D | E |
|---|---|---|---|---|---|
| 0 | | | | | |
| 1 | x | IN(x) | SQRT(x) | SQUARE(x) | EXP(x) |
| 2 | 1.632722351 | 0.490248776 | 1.277780244 | 2.665782276 | 5.11778818 |
| 3 | 2.674682106 | 0.983830534 | 1.635445537 | 7.153924365 | 14.5077371 |
| 4 | 3.585044479 | 1.276770881 | 1.893421369 | 12.852543920 | 36.0549613 |
| 5 | 4.638418715 | 1.534373514 | 2.153698845 | 21.514928171 | 103.3807437 |
| 6 | 6.373094400 | 1.852085129 | 2.524498841 | 40.616332227 | 585.8679363 |
| 7 | 6.764505402 | 1.911689148 | 2.600866279 | 45.758533340 | 866.5375144 |

WS1

| | A | B | C | D | E |
|---|---|---|---|---|---|
| 0 | | | | | |
| 1 | x | EXP(IN(X))-X | SQUARE(SQRT(X))-X | SQRT(SQRT(X))-X | IN(EXP(X))-X |
| 2 | 1.661774117 | 0 | 0 | 0 | 0 |
| 3 | 2.898598138 | 0 | 0 | 0 | 0 |
| 4 | EXP(WS0[7,1]) | 0 | 0 | 0 | 0 |
| 5 | 4.772002769 | 0 | 0 | 0 | 0 |
| 6 | 5.833183425 | 0 | 0 | 0 | 0 |
| 7 | 6.804255334 | 0 | 0 | 0 | 0 |

| | A | B | C | D | E |
|---|---|---|---|---|---|
| 0 | | | | | |
| 1 | x | IN(x) | SQRT(x) | SQUARE(x) | EXP(x) |
| 2 | 1.719407808 | 0.541979934 | 1.311261914 | 2.956363211 | 5.581222332 |
| 3 | 3.072902518 | 1.122622560 | 1.752969628 | 9.442729882 | 21.60451925 |
| 4 | 3.955982597 | 1.375229015 | 1.988965208 | 15.649798311 | 52.24700650 |
| 5 | 5.378316064 | 1.682375326 | 2.319119674 | 28.926283683 | 216.6571313 |
| 6 | 5.615119760 | 1.725462917 | 2.369624392 | 31.529569921 | 274.5462569 |
| 7 | 6.609564454 | 1.888517760 | 2.570907321 | 43.686342275 | 742.1597038 |

WS1

| | A | B | C | D | E |
|---|---|---|---|---|---|
| 0 | | | | | |
| 1 | x | EXP(IN(X))-X | SQUARE(SQRT(X))-X | SQRT(SQRT(X))-X | IN(EXP(X))-X |
| 2 | 2.344109697 | 0 | 0 | 0 | 0 |
| 3 | 3.213911425 | 0 | 0 | 0 | 0 |
| 4 | 4.096340905 | 0 | SQUARE(WS0(C4)-A4 | 0 | 0 |
| 5 | 5.131002148 | 0 | 0 | 0 | 0 |
| 6 | 6.057251973 | 0 | 0 | 0 | 0 |
| 7 | 7.224856084 | 0 | 0 | 0 | 0 |

```
ZEN SHEET™ STUDIO
FILE:///C:/PRI/ZS/SRC/INDEX.HTML#    100%
MOST VISITED  GETTING STARTED
ZEN SHEET™ STUDIO                    LOAD  SAVE  TICK  SYMBOLS  RESET

MODEL
  EXPRESSION     INPUTS x  FUNCTIONS x +
  POINT          DISTANCE
  BEST           /. (VAR P,VAR Q) +> VAR -> SQRT((P.PRICE - Q.PRICE) ^2 + (P.QUALITY -...
  DISTANCE
  DVEC           DVEC
  MINDX          /.(VAR T) => VAR -> FMAP(/.(VAR P) => VAR -> DISTANCE(T,P), PRODUCT)
  POS
  PRODUCT        MINDX
  RESULT         /.(VAR VEC) => VAR -> POS(MIN(VEC), VEC, 0)
  TARGET
                 POS
                 /.(VAR X, VAR VEC, VAR I) => VAR -> IF(X = VEC(I), I, POS(X, VEC, I + 1))

MINDX(DVEC(TARGET(0)))

0

PRODUCT(MINDX(DVEC(TARGET(0)))).NAME
                 "XADILLAC"
```

FIG. 5G

```
ZEN SHEET™ STUDIO
FILE:///C:/PRI/ZS/SRC/INDEX.HTML#    100%
MOST VISITED  GETTING STARTED
ZEN SHEET™ STUDIO                    LOAD  SAVE  TICK  SYMBOLS  RESET

MODEL
  EXPRESSION     INPUTS x  FUNCTIONS x  RESULT +
  POINT          DISTANCE
  BEST           /. (VAR P,VAR Q) +> VAR -> SQRT((P.PRICE - Q.PRICE) ^2 + (P.QUALITY -...
  DISTANCE
  DVEC           DVEC
  MINDX          /.(VAR T) => VAR -> FMAP(/.(VAR P) => VAR -> DISTANCE(T,P), PRODUCT)
  POS
  PRODUCT        MINDX
  RESULT         /.(VAR VEC) => VAR -> POS(MIN(VEC), VEC, 0)
  TARGET
                 POS
                 /.(VAR X, VAR VEC, VAR I) => VAR -> IF(X = VEC(I), I, POS(X, VEC, I + 1))

BEST
                 /.(VAR I) => VAR -> (T NAME, PRODUCT[MINDX(DVEC(T)))NAME)

DROP A MODEL VARIABLE HERE
```

FIG. 5H

SYSTEM AND METHOD FOR REACTIVE COMPUTING

BACKGROUND

Reactive computing is a computing paradigm based on the propagation of changes. Although infrequently recognized as a computing environment in its own right, at least outside of some academic circles, spreadsheets are an embodiment of such paradigm. Spreadsheet cells contain values or formulae (note that a formula can be considered a value, but most people draw a distinction) and changes to a cell are propagated to other cells, consistently with the invariants established by the formulae—e.g.: if z is defined by (contains) the formula x+y, the invariant z=x+y must be preserved even in the presence of changes to x and/or y.

Although the possible embodiments consistent with the above stated reactive computing principles are endless, the fundamental design of spreadsheet products has not changed much since the release of Visicalc™—the first spreadsheet intended for personal computing—in 1979. The approach of mapping data and calculations to named grids of nameless cells, referring to cells and ranges by their coordinates, has been well established for decades. This simple and intuitive approach remains the dominant one to this day. Note that the Wikipedia page for MS-Excel™, as of this writing, states: "Excel offers many user interface tweaks over the earliest electronic spreadsheets; however, the essence remains the same as in the original spreadsheet software, VisiCalc™: the program displays cells organized in rows and columns, and each cell may contain data or a formula, with relative or absolute references to other cells."

The current state-of-the-art, however, leaves much to be desired, as evidenced by the frequent complaints about spreadsheet documents being difficult to understand, error prone, hard to extend, and more. The nearly 4 decades old original design is the root cause of most of the problems that remain unresolved to this day: design choices made early on have robbed spreadsheets from achieving the full potential of the reactive computing paradigm they embody.

TECHNICAL CHALLENGES

Searching the Web for "spreadsheet problems," "spreadsheet issues," and the like results in a laundry list of disparate grievances and shortcomings. But these mostly capture symptoms, not root causes. Even in the academic literature it is hard to find systemic attempts to classify issues and identify the root causes of spreadsheet failings Recognizing that spreadsheets are a computing environment in their own right, and that, as such, implicitly define a programming language, even if mostly expressed visually, they may be anaylsed from the perspective of programming language design. Using that lens:

1. The type-system underlying spreadsheets is seriously deficient 1.1 Cells cannot have type constraints The type of values that can be entered and/or computed by a cell can be changed arbitrarily: For example, a cell can hold a string, then a number, then a formula that yields a number. In computer science, such a type system is known as unitype: i.e., from a static analysis perspective, there is only one type, and that type essentially means "anything goes." Such type systems are flexible at first, and good for prototyping, but also known to invite a myriad of opportunities to introduce errors, causing problems as programs and spreadsheet models become more complex. This disclosure will refer to such type systems as "variant-based" because the word "unitype" tends to confuse some people for various reasons. Note that most spreadsheets allow users to format cells, but formatting does not constrain cell values in any way. Said another way, cell formatting is just a rendering mechanism: It affects how to display a cell's value, but does not constrain the type of values that said cell can hold. Therefore, formatting does not change the variant-based nature of traditional spreadsheets.

1.2 Users can't define data structures that best reflect their conceptual models Even without type constraints, most variant-based systems offer ways to define data structures that best represent the model a user has in mind, such as arrays, records, and tuples. For instance, a user may want to define a Contact data type as a record with fields like "name," "address," "phone," and "date_contacted."

Unfortunately, in traditional spreadsheets, a user cannot define new data types that combine/aggregate data in more meaningful entities, like Contact above, much less create named variables that have the desired structure. The only concrete data structure available is "grid of nameless cells" known as the worksheet. Note, indeed, that the only objects users can create and name are worksheets, thus forcing users to map their conceptual model to regions in said grids, referring to the elements in them by their concrete grid coordinates, using the column-row A1 notation. Conceptual data structures, like the Contact data, exist only in the modeler's mind: From the perspective of the spreadsheet engine, there are only named grids with values and formulae scattered on them. The concrete representation bears no direct correspondence to the semantic of the conceptual model.

Apple Numbers™ offers one data structuring mechanism, the table, which is essentially an array of records. However, tables are not composable, i.e. they cannot be nested and users are forced to define a table, or hijack an element of a table, even for a simple scalar value.

The lack of a correspondence between the conceptual and the concrete model, along with the unfortunate "programming by coordinates" in the column-row style, is the root cause for most complaints about spreadsheets being hard to understand and manage. Users are forced to map their conceptual variables, of all shapes, (scalars, vectors, records, tables, etc.) to regions in a set of grids.

A partial solution to this problem is the use of name aliases, but name aliases are not enough, and come with their own pitfalls. Name aliases for cells and ranges suffer from all the typical problems of aliases in other computing paradigms: They are a poor and deceiving substitute for real objects. For example, in MS-Excel™, name aliases have global scope, where aliases with worksheet scope would be better in most cases, particularly when building a workbook with a bunch of scenario worksheets that have similar structure. Name aliases for ranges provide a way of defining a range ("prices of goods in 2014") but adding a single row/column directly in front of a named range does not extend the named range, neither does doing so after the last one, which creates a break between the defined alias and the hoped-for data it is meant to capture. For a user, even selecting the named range and extending the selection with the mouse does not work: To expand or contract a named range a user must add or delete rows/columns somewhere in between the beginning and the end, as if splitting the range, and then reorganize its content as necessary. All Excel™ users of a certain expertise have encountered this particular phenomenon.

Consider a (conceptual) vector of 100 contacts. In such case, name aliases are nearly futile because there are 100 'name' and 'email' fields. A possible solution to map such vector to the grid would be to create an alias for each column range of corresponding fields, hence looking at a (conceptual) vector of contact records as if it were a record with a vector for each field. The view transposition is better than nothing, but results in a loss of the logical connection between the fields of a given contact, and the user must maintain the constraint that the vectors should have the same length.

Being based on tables, similarly to a database system, Apple Numbers™ is again somewhat better than traditional spreadsheets in this regard, but, as mentioned before, it forces users to use tables for everything, which requires a database tablature mindset—a different but still rigid model—even when dealing with a single object, and still does not offer any ability to define types.

2. Users cannot easily and effectively define new functions 2.1 Spreadsheets do not allow users to define new functions except (and only for some of them) by leaving the confines of the pure spreadsheet, and entering a totally different realm, like VBA™ (Visual Basic for Applications, in MS-Excel™), or JavaScript™ (Google Sheets™) which is alien to most spreadsheet users and does not support the reactive computing paradigm.

In Microsoft Excel™, new functions can be added using VBA or compiling external code to create a library that can be dynamically linked with the spreadsheet. In Google Sheets™, custom functions can be written in JavaScript™. Both mechanisms require users to break out of the core spreadsheet environment, thus abandoning the functional reactive programming paradigm. There are at least three problems with these spreadsheet extensions:

- They support an imperative programming style. This is not a bad thing per se, but requires programmers to be careful about side effects. Mixing functional reactive and imperative programming, particularly in the presence of side effects, is error prone and requires a level of expertise that very few spreadsheet practitioners have.
- The language used to write custom functions is not a natural extension of the language of formulae supported in the worksheet. If the language used to write custom functions had been properly designed as an extension of the core spreadsheet functionality, then the expressions on the right hand side of assignment statements in VBA™ or JavaScript™ would exactly match the syntax and the semantic of formula expressions used in spreadsheet cells. That's not the case, however, because the extensions were created ad-hoc, hijacking existing compilers/interpreters to quickly add extra programmability, most likely for "go to market" reasons.
- The API that connects the spreadsheet extension (which makes possible to add user defined functions) to the core spreadsheet engine, must bridge two very different worlds and potentially introduces a significant performance bottleneck. That is indeed the case for VBA™.

2.2 Traditional spreadsheets do not offer built-in higher order functions, i.e. functions that can take other functions as arguments and/or return functions as a result, nor allow users to create their own higher order functions, so that the same can be called from the core spreadsheet. Lack of higher order functions is the reason behind the proliferation of functions like AVERAGEIF, COUNTIF, SUMIF, etc. Using higher order functional programming, it is easy to create such functions.

3. Spreadsheets entangle the computation model with its visualization 3.1 As discussed, there is a fundamental disconnect between the conceptual model—i.e. the model in the user's mind—and the concrete one, as realized by the data and formulae scattered on the worksheets. That is a problem per se, but perniciously compounded by another factor: The worksheets that underpin the concrete model are also the primary elements of visualization. In other words, worksheets serve a double duty, failing to properly fulfill both of them: 1) they act as the objects that maintain the state of the spreadsheet (data values and formulae) but also 2) act as the layout managers for presentation purposes. There is a one-to-one correspondence between tab panels in the workbook and the worksheets.

Apple's Numbers™ provides a limited exception, to this issue, as the visualization is supported by one or more free form canvases (sheets) that can contain not only multiple tables, but other elements, like charts, pictures, and text. Numbers™ is to a large extent more of a presentation application that supports tables with limited spreadsheet computing capabilities, at least in comparison to MS-Excel™. The separation between model and visualization is still imperfect, because 1) for a table to exist it must be shown somewhere, and 2) the same table cannot be visualized in two different sheets. In other words, model objects don't have an identity completely independent from their visual rendering, but it must be at least acknowledged that Numbers™ eliminates the class of problems related to reorganizing the spreadsheet layout, since the tables and other elements are free floating objects, not tied to a presentation grid.

The entanglement of model and visualization causes more problems than people realize.

Here is an example that shows a fairly common pitfall with prior art spreadsheets: that of "de-synchronizing" worksheets that must share common parameters.

3.1.1 Example 1: Changing a Cell

A hedge fund has developed a proprietary model to value certain complex financial instruments. The spreadsheet model blends three different valuation methods together. The workbook consists of a "Main" worksheet, which contains common parameters used by all the methods, plus one additional worksheet for each method: Method A, Method B, and Method C. The Main worksheet also contains the cell with a formula that combines the results of the three methods into a single value, i.e., it is the collector of the data being calculated in each of the other sheets. To make the method worksheets easier to read, each one of them contains cells that reference the common parameters from Main, such as the "risk free interest rate" (rfr). To keep formulae more compact, each method worksheet references shared parameters using the cells in the same method worksheet that in turn reference the common parameters in the Main worksheet: e.g. a formula in a method worksheet refers to the rfr using $B$4 rather than Main!$B$4. Note that it is important for the various methods to use consistent valuation parameters; otherwise the blended metric is flawed. This example assumes no use of aliases, although it would be appropriate for the shared parameters in this case.

An intern, named Karl, is particularly interested in studying the dynamics of Method B. He plays with a copy of the spreadsheet, doing some sensitivity analysis. Karl clicks on cell B4 and changes the rfr a little, typing in a constant like 2.5% (0.025), to see the effect of an interest rate change on other parts of the model. Karl may not have noticed that the interest rate displayed on that cell was not a number, but the result of referencing cell B4 in the Main worksheet. Or he may have noticed and intended to restore the formula but forgot to do so. Or maybe he is not aware that the method worksheets are intended to work with a consistent set of parameters to provide a blended value, thinking instead of them as independent alternate valuation methods. Whatever the reason, the worksheet he altered is now out of sync with the common rfr parameter in the Main worksheet. Method B be is now assuming a risk-free-rate of 2.5% no matter what the (now supposedly) "common" parameter is: The blended valuation is flawed. A bug like this can easily go unnoticed for months. Macro-economy dependent input parameters, like interest rates, don't change much over time, and tend do so slowly. The result given by Method B may look very reasonable, and its effect on the blended value is further diluted by the other methods. But the consequences of this bias will accumulate over time.

This bug can't happen in an environment that properly separates model from visualization. In said environment, the parameter rfr would be shown on all the method worksheet, but still retain its single identity. It would be a real object, with its own name (not an alias) instead of being a conceptual entity mapped to a nameless cell in Main. Besides bug introduction dynamics like the one described above, which stem from lack of an object identity independent from its visualization, the entanglement of model and visualization is a frequent cause of bugs for another reason. Users frequently decide to change the layout of a worksheet, for presentation purposes. Moving formulae around is a major cause of bugs, particularly when using cut and paste without mastering the use of absolute and relative references.

3.4.2 Example 2: Entangled Concept in the Visualization

FIG. 2 shows a traditional spreadsheet view 200 showing a marketing matching algorithm linking a product's characteristics to a consumer's importance of price, quality, and design ratings for certain products and targets in an array, with a later calculation of the distance between them, as well as a minimum—where the minimum shows the best choice for a consumer.

The distance values may be given by generally:

$$\text{DISTANCE}(\text{Target},\text{Product})=\text{SQRT}((\$[\text{TargetPrice}]-\$[\text{Product}]\$[\text{Price}])^2+(\$[\text{TargetQuality}]-\$[\text{Product}]\$[\text{Quality}])^2+(\$[\text{TargetDesign}]-\$[\text{Product}]\$[\text{Design}])^2)$$

Which converts specifically to a 4 of the 12 formulae in the sheet:

$$\text{DISTANCE}(\text{ALICE},X)=\text{SQRT}((\$B11-\$B4)^2+(\$C11-\$C4)^2+(\$D11-\$D4)^2)$$

$$\text{DISTANCE}(\text{ALICE},Y)=\text{SQRT}((\$B11-\$B5)^2+(\$C11-\$C5)^2+(\$D11-\$D5)^2)$$

$$\text{DISTANCE}(\text{BETTY},X)=\text{SQRT}((\$B12-\$B4)^2+(\$C12-\$C4)^2+(\$D12-\$D4)^2)$$

$$\text{DISTANCE}(\text{BETTY},Y)=\text{SQRT}((\$B12-\$B5)^2+(\$C12-\$C5)^2+(\$D12-\$D5)^2)$$

Also, F19=MIN($B19:$D19) . . . etc. Note that preferred matches (min distance) are highlighted. The entire spreadsheet is shown in FIG. 2. Note different tables mapped to a single worksheet grid.

Such a model introduces typical "coordinate soup" problem: It would be nice to at least be possible to define a function DISTANCE and use such function in the (conceptual) distance matrix at B19:C20. A user also cannot define a Point type to package together the information of a target or product point.

4. Administration and security

Spreadsheets are realized as files and hence get shared by copying them and giving them to others, which inevitably causes the proliferation of multiple versions and consistency problems, making practically impossible to enforce standards in any non-trivial enterprise or organization.

Spreadsheets offer few or no security mechanisms, other than locking/freezing some cells/ranges with a password. In particular, there is no layered security mechanism that could provide different kind of users (modelers, accountants, interns etc.) different levels of access to shared models. Ideally a system would allow an experienced user, say operating at level X, to create reusable definitions that users at a less experienced level Y can access, for their own benefit, without being able to alter, and potentially break, them.

SUMMARY OF THE EMBODIMENTS

A reactive spreadsheet in which the functionality of the reactive spreadsheet is decoupled from the visualization, where the same object or variable may appear in different tabs and panels while still retaining its identity.

A reactive worksheet client that uses variables in computations may include: a variable panel in which a user can view names of one or more created variables; and a variable view panel that allows a user to view a selected variable from the one or more created variables. The user can view a value of one or more of the created variables within the variable view panel. The user can also edit the one or more created variables within the variable view panel, and wherein editing the variable within the variable view panel changes the variable in the variable panel.

BRIEF DESCRIPTION OF THE DRAWINGS

FIGS. 4A-4J show a spreadsheet model example using the GRCSM.

FIGS. 5A-5I show a targeted marketing model example using the GRCSM.

DETAILED DESCRIPTION OF THE EMBODIMENTS

Hardware Introduction

Figure 1A:
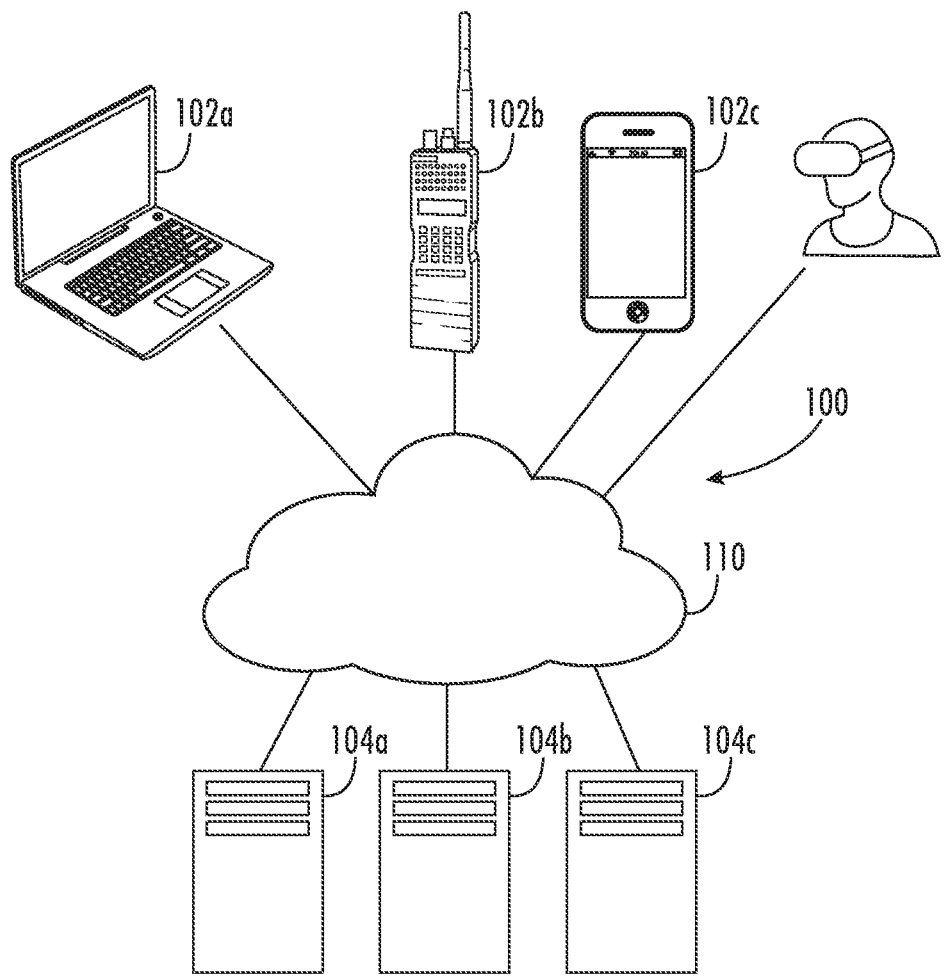
FIG. 1A shows a network diagram of different components of the system.

The system and method for the Reactive Spreadsheet method and system described may be implemented using system and hardware elements shown and described herein. For example, FIG. 1A shows an embodiment of a network 100 with one or more clients 102a, 102b, 102c that may be local machines, personal computers, mobile devices, servers, or tablets that communicate through one or more networks 110 with servers 104a, 104b, 104c. It should be appreciated that a client 102a-102c may serve as a client seeking access to resources provided by a server and/or as a server providing access to other clients.

The network 110 may be wired or wireless. If it is wired, the network may include coaxial cable, twisted pair lines, USB cabling, or optical lines. The wireless network may operate using BLUETOOTH, Wi-Fi, Worldwide Interoperability for Microwave Access (WiMAX), infrared, or satellite networks. The wireless links may also include any cellular network standards used to communicate among mobile devices including the many standards prepared by the International Telecommunication Union such as 3G, 4G, and LTE. Cellular network standards may include GSM, GPRS, LTE, WiMAX, and WiMAX-Advanced. Cellular network standards may use various channel communications such as FDMA, TDMA, CDMA, or SDMA. The various networks may be used individually or in an interconnected way and are thus depicted as shown in FIG. 1A as a cloud.

The network 110 may be located across many geographies and may have a topology organized as point-to-point, bus, star, ring, mesh, or tree. The network 110 may be an overlay network which is virtual and sits on top of one or more layers of other networks.

In most cases, every device on a network has a unique identifier. In the TCP/IP protocol, the unique identifier for a computer is an IP address. An IPv4 address uses 32 binary bits to create a single unique address on the network. An IPv4 address is expressed by four numbers separated by dots. Each number is the decimal (base-10) representation for an eight-digit binary (base-2) number, also called an octet. An IPv6 address uses 128 binary bits to create a single unique address on the network. An IPv6 address is expressed by eight groups of hexadecimal (base-16) numbers separated by colons.

An IP address can be either dynamic or static. A static address remains constant for a system unless modified by a user. Dynamic addresses are assigned by the Dynamic Host Configuration Protocol (DHCP), a service running on the network. DHCP typically runs on network hardware such as routers or dedicated DHCP servers.

Dynamic IP addresses are issued using a leasing system, meaning that the IP address is only active for a limited time. If the lease expires, the computer will automatically request a new lease. Sometimes, this means the computer will get a new IP address, too, especially if the computer was unplugged from the network between leases. This process is usually transparent to the user unless the computer warns about an IP address conflict on the network (two computers with the same IP address).

Another identifier for a device is the hostname. A hostname is a human-readable label assigned to a device and can be modified by a user. Hostname can be resolved to the IP address of the device. This makes hostname a more reliable device identifier in a network with dynamic IP addresses.

Information in the IP Address may be used to identify devices, geographies, and networks. The hostname may be used to identify devices.

A system may include multiple servers 104a-c stored in high-density rack systems. If the servers are part of a common network, they do not need to be physically near one another but instead may be connected by a wide-area network (WAN) connection or similar connection.

Management of group of networked servers may be de-centralized. For example, one or more servers 104a-c may include modules to support one or more management services for networked servers including management of dynamic data, such as techniques for handling failover, data replication, and increasing the networked server's performance.

The servers 104a-c may be file servers, application servers, web servers, proxy servers, network appliances, gateways, gateway servers, virtualization servers, deployment servers, SSL VPN servers, or firewalls.

When the network 110 is in a cloud environment, the cloud network 110 may be public, private, or hybrid. Public clouds may include public servers maintained by third parties. Public clouds may be connected to servers over a public network. Private clouds may include private servers that are physically maintained by clients. Private clouds may be connected to servers over a private network. Hybrid clouds may, as the name indicates, include both public and private networks.

The cloud network may include delivery using IaaS (Infrastructure-as-a-Service), PaaS (Platform-as-a-Service), SaaS (Software-as-a-Service) or Storage, Database, Information, Process, Application, Integration, Security, Management, Testing-as-a-service. IaaS may provide access to features, computers (virtual or on dedicated hardware), and data storage space. PaaS may include storage, networking, servers or virtualization, as well as additional resources such as, e.g., the operating system, middleware, or runtime resources. SaaS may be run and managed by the service provider and SaaS usually refers to end-user applications. A common example of a SaaS application is SALESFORCE or web-based email.

A client 102a-c may access IaaS, PaaS, or SaaS resources using preset standards and the clients 102a-c may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1B:
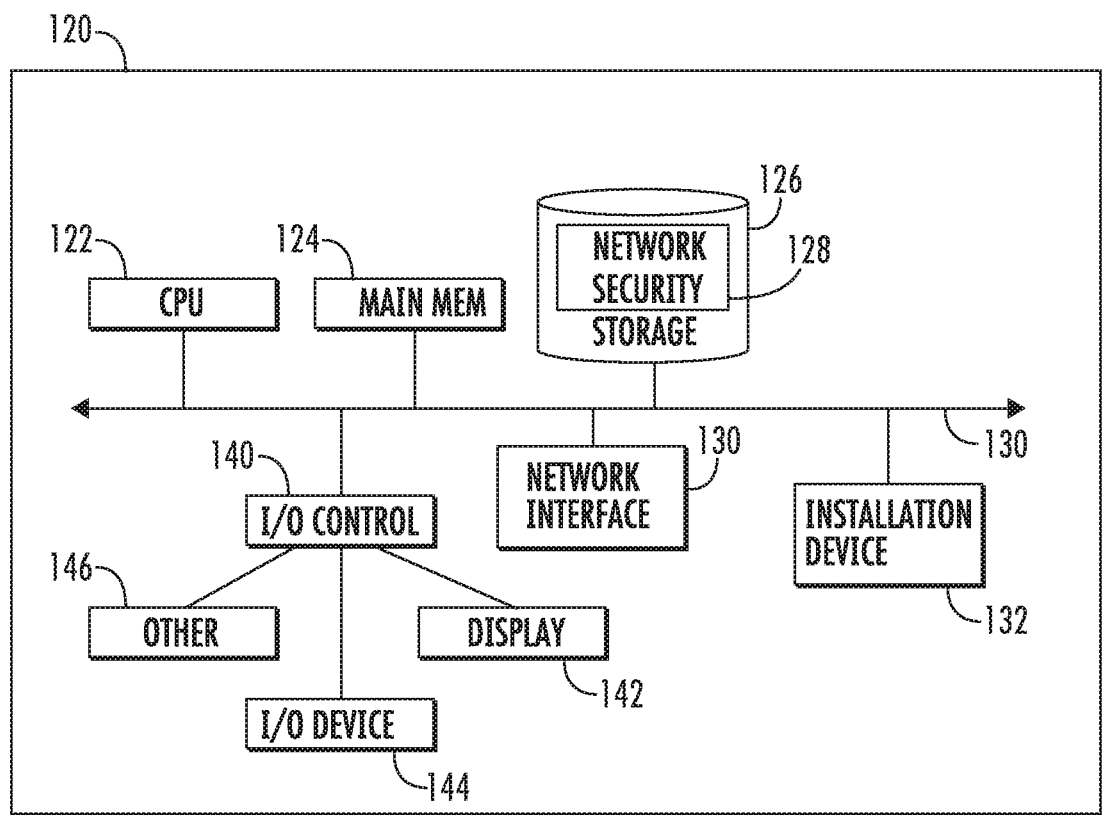
FIG. 1B certain hardware components for use with the system.

The clients 102a-c and servers 104a-c may be embodied in a computer, network device or appliance capable of communicating with a network and performing the actions herein. FIGS. 1A and 1B show block diagrams of a computing device 120 that may embody the client or server discussed herein. The device 120 may include a system bus 150 that connects the major components of a computer system, combining the functions of a data bus to carry information, an address bus to determine where it should be sent, and a control bus to determine its operation. The device includes a central processing unit 122, a main memory 124, and storage device 126. The device 120 may further include a network interface 130, an installation device 132 and an I/O control 140 connected to one or more display devices 142, I/O devices 144, or other devices 146 like mice and keyboards.

The storage device 126 may include an operating system, software, and a network user behavior module 128, in which may reside the network user behavior system and method described in more detail below.

The computing device 120 may include a memory port, a bridge, one or more input/output devices, and a cache memory in communication with the central processing unit.

The central processing unit 122 may be a logic circuitry such as a microprocessor that responds to and processes instructions fetched from the main memory 124. The CPU 122 may use instruction level parallelism, thread level parallelism, different levels of cache, and multi-core processors. A multi-core processor may include two or more processing units on a single computing component.

The main memory 124 may include one or more memory chips capable of storing data and allowing any storage location to be directly accessed by the CPU 122. The main memory unit 124 may be volatile and faster than storage memory 126. Main memory units 124 may be dynamic random-access memory (DRAM) or any variants, including static random-access memory (SRAM). The main memory 124 or the storage 126 may be non-volatile.

The CPU 122 may communicate directly with a cache memory via a secondary bus, sometimes referred to as a backside bus. In other embodiments, the CPU 122 may communicate with cache memory using the system bus 150. Cache memory typically has a faster response time than main memory 124 and is typically provided by SRAM or similar RAM memory.

Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, 3D printers, and VR headsets.

Additional I/O devices may have both input and output capabilities, including haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures.

In some embodiments, display devices 142 may be connected to the I/O controller 140. Display devices may include liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, VR or 3D displays.

The computing device 120 may include a network interface 130 to interface to the network 110 through a variety of connections including standard telephone lines LAN or WAN links (802.11, T1, T3, Gigabit Ethernet), broadband connections (ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols. The computing device 120 may communicate with other computing devices via any type and/or form of gateway or tunneling protocol such as Secure Socket Layer (SSL) or Transport Layer Security (TLS). The network interface 130 may include a built-in network adapter, network interface card, PCMCIA network card, EXPRESSCARD network card, card bus network adapter, wireless network adapter, USB network adapter, modem or any other device suitable for interfacing the computing device 120 to any type of network capable of communication and performing the operations described herein.

The computing device 120 may operate under the control of an operating system that controls scheduling of tasks and access to system resources. The computing device 120 may be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein.

The computer system 120 can be any workstation, telephone, desktop computer, laptop or notebook computer, netbook, tablet, server, handheld computer, mobile telephone, smartphone or other portable telecommunications device, media playing device, a gaming system, mobile computing device, or any other type and/or form of computing, telecommunications or media device that is capable of communication.

The status of one or more machines 102a-c, 104a-c may be monitored, generally, as part of network management. In one of these embodiments, the status of a machine may include an identification of load information (the number of processes on the machine, CPU and memory utilization), of port information (the number of available communication ports and the port addresses), session status (the duration and type of processes, and whether a process is active or idle), or as mentioned below. In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

Definitions

As used herein, the following terms may be interpreted in non-limiting terms as follows.

Spreadsheets except where stated otherwise, or made clear by the context, refers to traditional spreadsheets.

Generalized Reactive Computing System and Method (GRCSM) is the term for the generalized spreadsheet herein.

Spreadsheet Computing is a computing paradigm whereas variables (worksheet cells) are defined by formulae. A cell is automatically recalculated when variables referenced in its formula change. Note that the distinction between a cell holding a value (constant) or a formula is, from a semantic perspective, an artificial one: A constant value is a formula that does not depend on other variables. Given that the state of the system continuously reacts to changes, it is a sub-class of the reactive computing paradigm. Moreover, the paradigm is not purely functional when considering interaction with the user and/or the effect of external sources: The state of the system changes when cells are altered. In the absence of external sources, and ignoring time-dependent as well as stochastic pseudo-functions [e.g. random number generators], a spreadsheet model is purely functional. Therefore, it is proper to regard spreadsheets as functional reactive systems.

Model/Spreadsheet Model: the mathematical model, described by a workbook: i.e. the workbook ignoring all the visualization rendering aspects.

1. Introduction to the Generalized Reactive Computing System and Method (GRCSM)

The GRCSM described herein generalizes traditional spreadsheets by incorporating widely-accepted principles of programming language design, while still supporting (i.e. not breaking) traditional modeling. The result is:

a wide spectrum computing environment that provides a serious and effective tool for the casual spreadsheet practitioner, the MS-Excel™ power user, a software engineer, a quant wizard who is accomplished at MS-Excel™, C++, and a functional programming language like Haskell or OCaml!

ideal for gradual learning: Such a GRCSM could provide introductional functional programming to high-school and college students and even to spreadsheet practitioners.

The GRCSM may have at least the following feature set:

1. The GRCSM is a spreadsheet like apparatus that implements a modern type system. It supports:

user defined types:

a. The GRCSM type system may allow users to define new types, associating a name to the result of applying any combination of the basic type constructors to existing types. For instance, b. type Pair:=struct {var first; var second;};

c. type PairList array[ ]=>Pair d. respectively define a new type, named Pair, that consists of a pair of variant fields, named first and second, and another new type, named PairList, that describes an array of pairs.

e. Once defined, the new types can be used as built-in ones, e.g.

f. Pair p; // p.first and p.second will denote the fields g. PairList pl:=[p]; // pl[0] will denote the first element in the list, pl[0].first will denote the first field of the first element in the list, and so on The GRCSM type system may allow fully composable data structures (i.e. structures that allows arbitrary nesting);

a. All type constructors may be orthogonally composable, i.e. can be combined without restrictions. Hence structs of arrays, arrays of structs, functions that take an array of structs may be defined as argument and return a struct of arrays, etc.

The GRCSM type system may allow structs with named and unnamed fields;

a. fields in structs can have names or not. Structs that don't have named fields are known as tuples, and their elements can be accessed using subscript notation with constant indices; e.g. given:

b. struct {int; string;} descriptor:=(9, "nine");

c. descriptor[0] will evaluate to 9 d. descriptor[1] will evaluate to "nine"

e. descriptor will evaluate to (9, "nine") i.e. a tuple with two elements

GRCSM may support arrays of one or more dimensions. An array object can grow or shrink along any dimension; for instance, e.g. users can add/remove rows/columns from a matrix; but the dimensionality itself is part of the type of the object and cannot change;

The GRCSM type system may allow functions types that describe possible function values, making them first class citizens of the type system as much as the other types, which means that function values can be assigned to variables, passed as arguments to other functions, and returned as the result of a function call.

The GRCSM type system may allow strictly statically typed variables along with variants;

a. Providing the users with the option of declaring variables with more strictly defined types, as opposed to variants, makes possible for the GRCSM to validate type consistency statically, i.e. before the model is evaluated. On the other hand, supporting variants is a) is what spreadsheet practitioners are used to, b) what software engineers find useful for the purpose of rapid prototyping in agile development. Allowing variants to coexist with more strict types leaves the choice to users, providing in principle the best of both worlds.

Variant Type

The GRCSM type system may support the notion of a type that can hold any value, including different values at different times in the lifetime of a model.

The GRCSM type system may include the notion of lazy-ness. A formula (expression) like x+y, where x and y have type int, has type lazy int, which means that it will yield a value of type int when evaluated. Note that cells in spreadsheet may contain formulae that are not reduced to a constant, just like x+y. Propagating state changes and computing formulae on demand, i.e. when needed (hence the designation as lazy) is the essence of spreadsheets. By including lazy types, and allowing the same to be orthogonally composed—i.e. arbitrarily combined—with other types, GRCSM is capable of expressing the reactive computing paradigm even better than traditional spreadsheets The GRCSM may implement type inference strictly typed modeling with less effort and with more compact definitions. When, and as directed by the user, independently for each variable definition, the GRCSM environment may infer the type of a variable from the expression used to initialize the same. The resulting behavior will then be the same as if the user had defined the variable to strictly have such inferred type. Any attempt to assign a value to said variable that is incompatible with the inferred type of the variable may be rejected with an error, as is the case for variables explicitly defined to strictly have such type. Thus, the difference between explicit and inferred type definitions is how the type gets determined. The GRCSM also has the ability to bind one or more symbols with the types inferred in the inference analysis process, by simply requiring the user to specify such symbols as placeholders. Here are some definitions using the current syntax supported by the GRCSM:

a. ::x:=1+uniform( ); // x will be defined as having type double b. ::x:='1+uniform( )'; // x will be defined as having type lazy double c. ::pair:=("log(1)", log(1)); // pair has type struct {string; double;} d. :P:pair:=("log(1)", log(1)); // same as above, plus i. P is defined as an alias for type struct {string; double;} Struct {:S:; :D:;} pair:=("log(1)", log(1)); // same as above, plus i. S is defined as an alias symbol for type string ii. D is defined as an alias symbol for type double In the current syntax, the double colon :: used in lieu of an explicit type, means "infer the corresponding type." If a symbol is inserted between the colons, the behavior is the same with the added effect that such symbol becomes an alias for the inferred type.

The GRCSM may support the traditional, widely used, spreadsheet notation for cell references, known as 'A1 notation'. This reduces the cognitive barrier of entry for spreadsheet practitioners, makes possible to demonstrate that a traditional spreadsheet model can be converted to an equivalent one in a GRCSM environment, facilitates gradual learning of advanced features by reducing the number of things that need to be changed simultaneously, and facilitates model migration. A1 notation may introduce errors and the GRCSM provides a path for its elimination from models, as opposed to simply help detect reference errors in said models.

Other feature sets will become clearer in the description that follows.

2. Architecture Overview

Figure 1C:
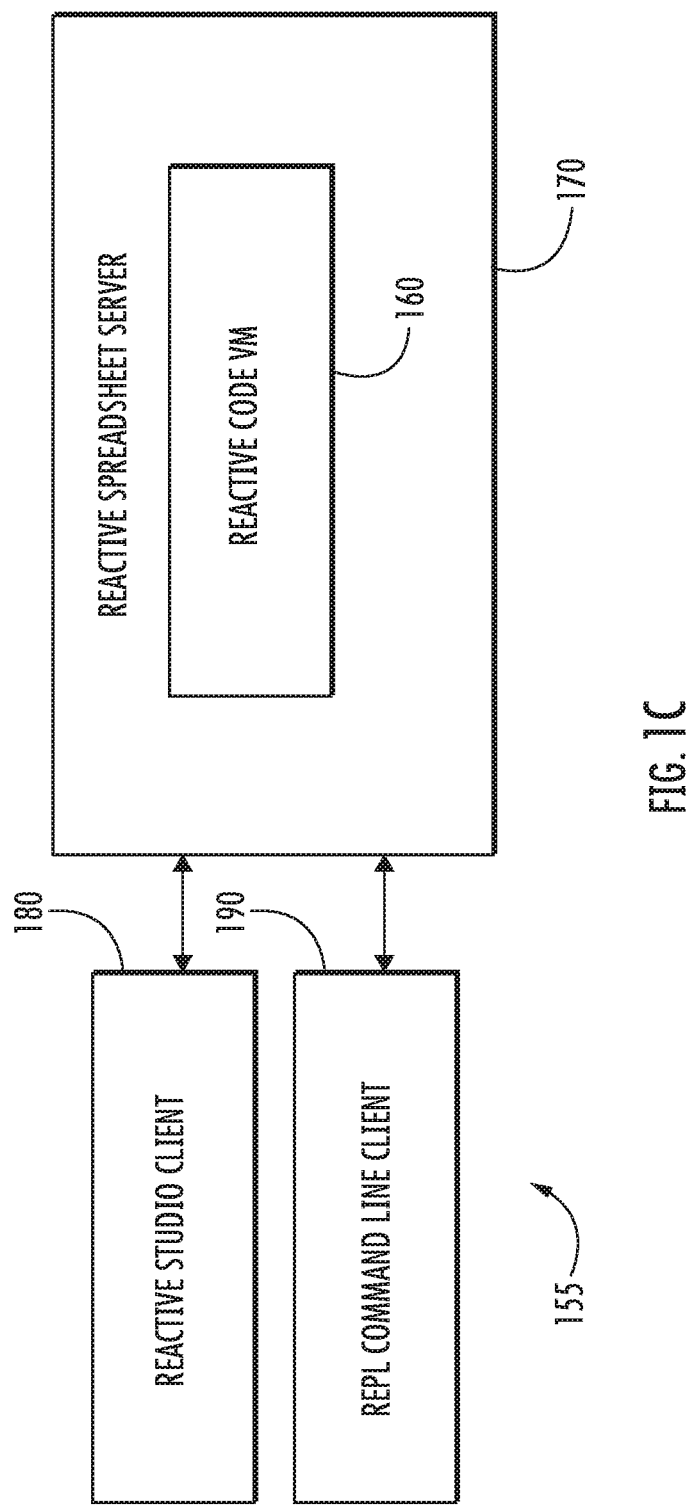
FIG. 1C shows a proposed architecture to support the Generalized Reactive Computing System and Method (GRCSM) described herein.

FIG. 1 shows a proposed architecture for the Reactive Sheet model 155 described herein. The GRCSM may be based on a language referred to as General Reactive Computing Code (GRCC). A GRCSM model corresponds to the state of the GRCC VM 160, and can be represented by a set of variable definitions. The GRCC VM 160 may be wrapped by a communications layer 170 that handles asynchronous requests and notifications from/to multiple networked clients (180, 190). This communications layer 170 exposes the GRCC APIs, in particular the pub/sub API, which allows clients to continuously monitor live models.

The entire server-side package may be referred to as the GRCC Server 170. Server APIs may include valid GRCC expressions and actions, that provide easy connections to GRCSM instances to form reactive computing pipelines. Writing a (read-eval-print-loop) REPL client 190 is straightforward, but a REPL may not provide an optimal user experience. Thus, GRCSM Studio 180 is a client that delivers a required spreadsheet look-and-feel for editing and visualizing models.

3. General Reactive Computing Code (GRCC) Programming Language

The GRCC type system includes the notion of laziness. Lazy variables are the make GRCC models "reactive", i.e. behave like a spreadsheet. When the state of a variable changes, all the lazy variables that depend on it are recomputed at some point before observing their value. In traditional models, "Worksheets" are the only data structures provided by traditional spreadsheets. This is unfortunate: Users are forced to map their conceptual model to a reified set of grids. Model variables are referenced via their grid coordinates, using A1-style notation. This approach quickly turns any non-trivial spreadsheet into a mess of hard to read formulae. As mentioned, this is the "coordinate soup problem" and name aliases for cells and ranges partially alleviate this issue, but are no substitute for properly named variables.

The GRCC type system supports dynamically-sized arrays. The number of dimensions and the type of elements of an array completely describe its type. To facilitate converting legacy models to more expressive GRCSM ones, GRCC supports the A1 notation, with or without absolute reference '$' modifiers. This notation is not encouraged and, except for migration purposes, may be avoided. Support for the A1 notation, however, leads to a unifying result: A worksheet is a 2-dimensional array of lazy variants. Indeed, if ignoring extensions like solver and VBA, and assume that all predefined functions are available, it is always possible to convert a traditional workbook into a GRCSM model: and every worksheet is implemented as a 2D array of lazy variants and all may be left intact.

Error values, which adopt codes compatible with traditional spreadsheets, e.g. #NUM!, #REF!, etc., are part of the type system. Support for gradual static typing in a live environment like the GRCSM improves error handling.

In GRCSM environment, the computational model is fully independent from its visualization. The entanglement between model and visualization, encountered in the most popular spreadsheets, forces user to "rearrange" conceptual model objects, forcibly mapped to the concrete grid layout of the worksheet To enforce model-view separation, the GRCSM VM is visualization agnostic by design. The GRCSM server 170 APIs provide the functions necessary to obtain model state. Visualization is entirely left to GRCSM clients 180. This does not preclude a client 180 from using a server 170 instance (there may be more than one) to save a model that represents visual UI elements, but it is entirely up to the client to define and interpret such model. The pub/sub API is designed around a concept named "model view," but this concept does not violate the model-view separation principle: a "model view" may be a subset of valid model expressions. Clients define and subscribe to model views to control which asynchronous updates they receive.

GRCSM may offer imperative programming extensions. Moreover, the standard GRCC library provides built in procedures and "quasi functions,: i.e. functions that are not entirely stateless, yet do not alter the state of user-defined variables. Besides functions like date and time, the most popular "quasi functions" are pseudo-random number generators for various stochastic distributions. These functions are indispensable to implement Monte Carlo simulations.

3.1 GRCSM Type System

The essence of the type system supported by the GRCSM can be described by the following grammar:

T→B (currently supported Base types are: null, bool, int, double, and string)

This means that basic types like int, string, etc. are part of the type system GRCSM may support more basic data types without breaking its functionality T→array[ ]=>T|T→array[,]=>T|T→array[,,]=>T . . .

This denotes the type of arrays of T one, two, three, or more dimensions. T can be any valid type of the type system described by this grammar.

T→struct {<field.definition.list>};

This denotes struct types. As already mentioned, fields can be named or not. Preferably, all fields of none should be named—although the current implementation allows amix of named and unnamed fields. Although a field may not have a name (label), it must always have a type, which may be variant, to indicate T→fun(<argument.declarations>)=>T This is the syntax that describes function types. Function arguments can have strictly defined types, like int, array [ ]=>double, etc; or restricted/partially restricted ones, like var, array[,]=>lazy var, etc.

T→lazy T

As stated elsewhere, lazy types describe the value of possibly unreduced (non-evaluated) formulae.

T→var

The variant type. A variable of type var, i.e. a variant variable, can hold any value T→:<identifier>:

The GRCSM computing environment may support type inference, as explained herein.

3.1.2 User Defined Functions

The GRCC supports user-defined functions, including higher order ones. The function definition syntax may be a natural extension of the syntax of formulae. As an example, consider two points, p and q, each one with its own x and y coordinates, and a user wants to compute the Euclidian distance between the same. In a traditional spreadsheet, the user may program a cell with a distance-measuring formula like this:

$$SQRT((A4-C4)^2+(B4-D4)^2)$$

to render the difference between the points.

In a GRCSM, the user may write the formula like this (points are structs with x and y coordinates):

$$sqrt((p \cdot x - q \cdot x)^2 + (p \cdot y - q \cdot y)^2)$$

The user can write function value as follows:
fun(Point p, Point q)→sqrt((p·x−q·x)^2+(p·y−q·y)^2)

Which can be read "function that takes points p and q as arguments and returns the square root of . . . " etc. When applied, the function returns the value of the expression indicated by the arrow.

Note how the right-hand side of the arrow is identical to the formula the user wrote before. In the GRCSM there is never a mismatch between the language of formulae and the language used to define functions, because they are all part of one and the same GRCC language.

The user may want to save such value in a variable of type function, so that the user may use the name of the variable to call the function. The user accomplishes this as follows:
  ::distance:=fun(Point p, Point q)→sqrt((p·x−q·x)^2+(p·y−q·y)^2);

Which can be read as "define distance as a function that takes two points p and q as arguments and . . . " same as before. This definition creates a new variable, named distance, and initializes it with the function value. Now, the user can compute the distance between points r and s, write the following:

distance(r, s)

This will compute the function expression after substituting p with r and q with s.

User defined functions can be compiled on the fly (just in time compilation) achieving performance on par with pre-compiled, built-in, functions.

4. The GRCSM Client

Figure 3A:
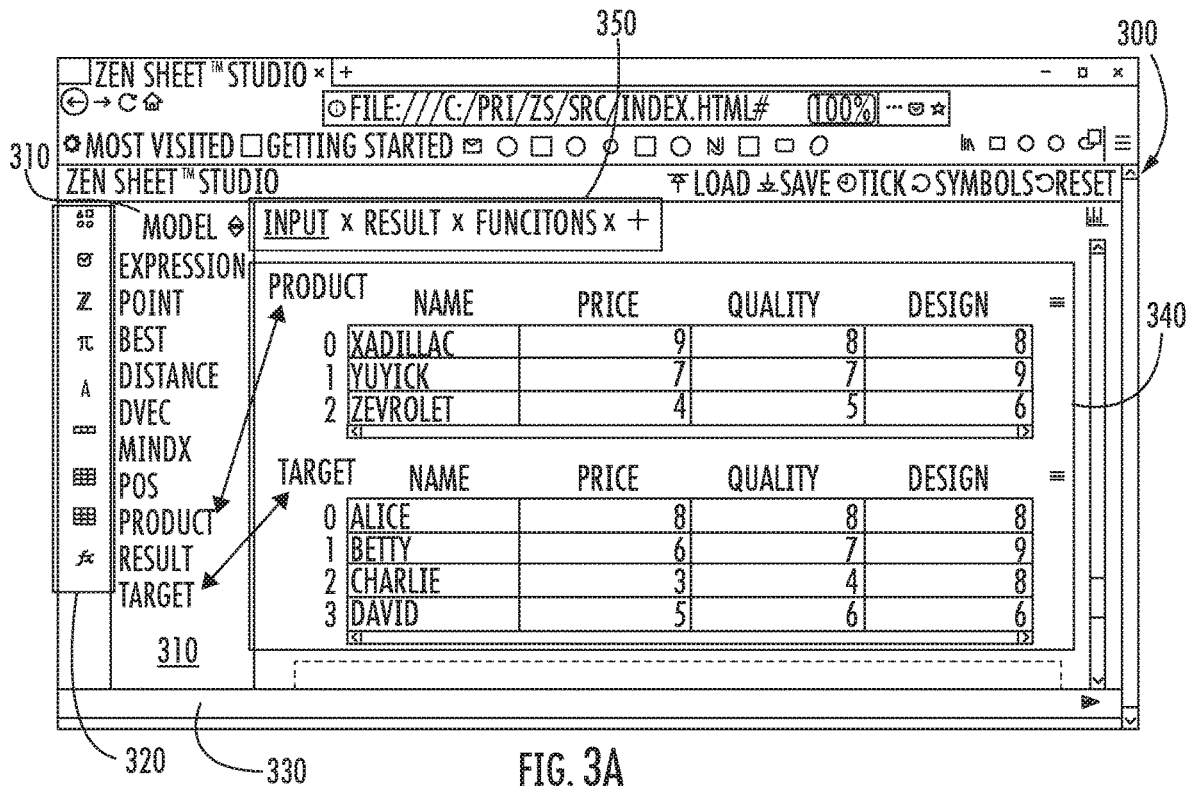
FIGS. 3A, 3B, and 3C show an example Generalized Reactive Computing System and Method (GRCSM) client in use with a programming example.
Figure 3B:
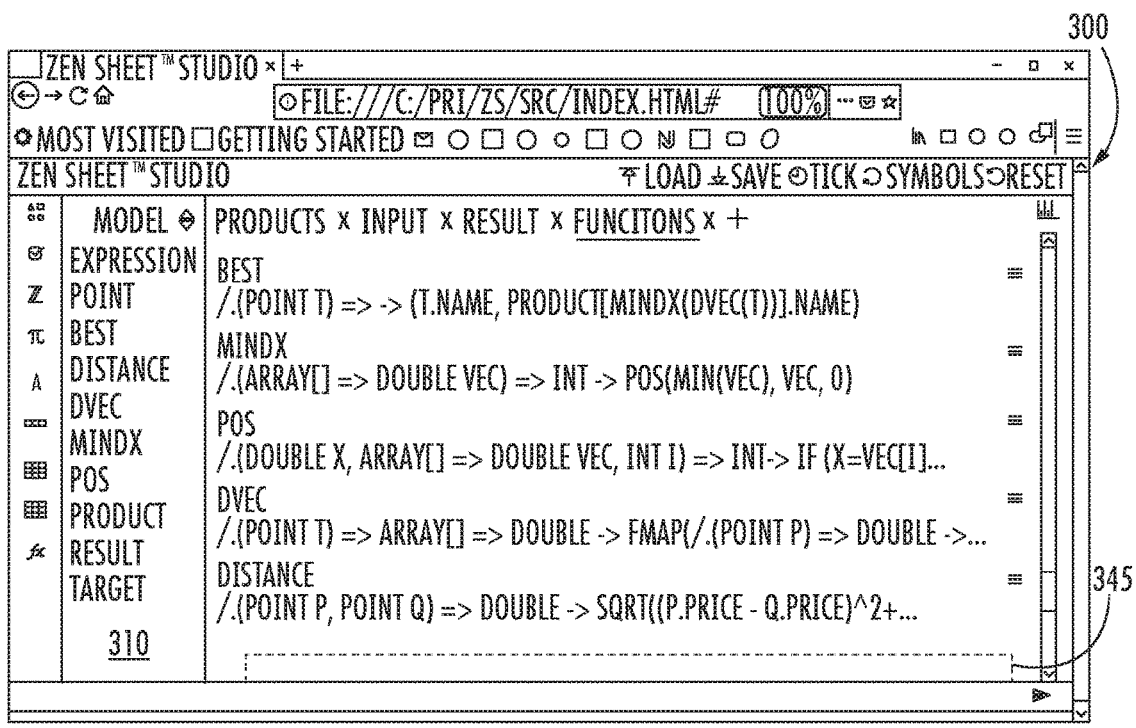
Figure 3C:
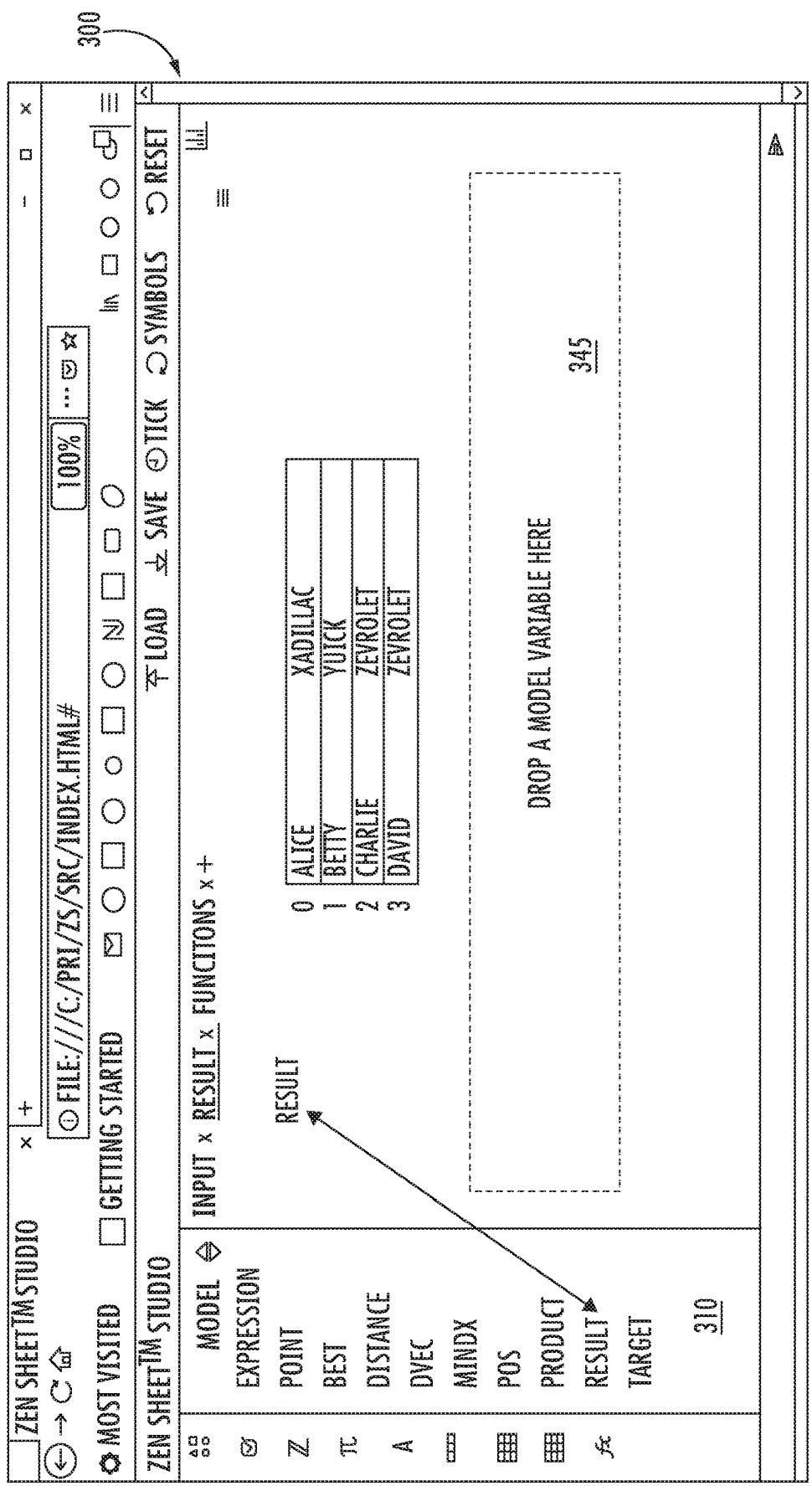

FIGS. 3A, 3B, and 3C show an example GRCSM client 300 in use with the matching example introduced in the background and discussed herein. It should be appreciated that this client 300 provides a user with something like a "deconstructed" spreadsheet tool having several distinct user interaction areas including:

A variable panel 310 in which a user can see the variables created for the GRCSM currently open.

A variable shortcut creation menu 320 that provides a shortcut to commands for creating variables like formulas, arrays, etc.

A command line 330 for entering and manipulating variables.

A variable view panel 340 that allows for a user to see a selected variable panel 310. As can be seen in FIG. 3C, a user can drag-and-drop a variable from the variable panel 310 into the variable view panel 345 in the drop area 345. As seen in FIGS. 3A, 3B, and 3C, arrows (not part of the client UI) link the variables in the variable panel 310 to the variables in the variable view panel 340 that have already been moved into the view panel 340.

A panel/worksheet tab 350 summary that allows a user to switch between active worksheets (as shown, the currently active worksheet is shown as underlined).

For example, the Reactive Studio Client 180 may display

The unrestricted combination of laziness and composite types implies that entire visual ranges may collapse into a single formula editing box 330 when editing. This happens when a single formula yields a composite value that is expanded on the screen. Such behavior is not only consistent with the model structure, but also more intuitive than "hacks" like the Ctrl-Shift-Enter combination adopted by MS-Excel™ to enter "array formulas," i.e. array-valued formulae.

Instead, editing of any variable may be done from any worksheet by selecting the variable from within the variable view panel 340 and making a desired change. The elegance of this from a conceptual view is that this manipulation from within one sheet "flows" through all sheets and recurrences of the same variable, avoiding the intern example discussed above.

To support large models efficiently, the Reactive Studio Client may handle arrays using UI virtualization.

5. Programming Examples

5.1 Creation of Spreadsheet Functionality Example

This example shows how the GRCSM can express traditional spreadsheet models as shown in FIGS. 4A-4J.

Users can create an object that behaves like a worksheet by simply dragging the worksheet icon 325 in the variable shortcut creation menu 320 into a variable viewing panel area 340. Note that the object "behaves like" a worksheet, because, in the GRCSM, worksheets are arrays: true model objects, not tied to any visualization. Specifically, there are two kind of arrays that behave like worksheets:

This can be written in in GRCC as a two-dimensional arrays of lazy variants: i.e. arrays of type: array[,]=>lazy var, or an arrays of arrays of lazy variants: i.e. arrays of type array[ ]=>array[ ]=>lazy var.

The drop operation (the end portion of the user drag-and-drop of the worksheet object 325) creates a two-dimensional array of lazy variants, with labels corresponding to typical column coordinates, in row 0 of each column, for user's convenience. Note that arrays in GRCC may be zero based and "worksheets" are just arrays, so they follow the same rule. For full correspondence to an MS-Excel™ worksheet, column zero may be ignored and row zero used for column labels, as is the case here. Once created, the "worksheet" can be changed in size when so desired.

Figures 4A, 4B:
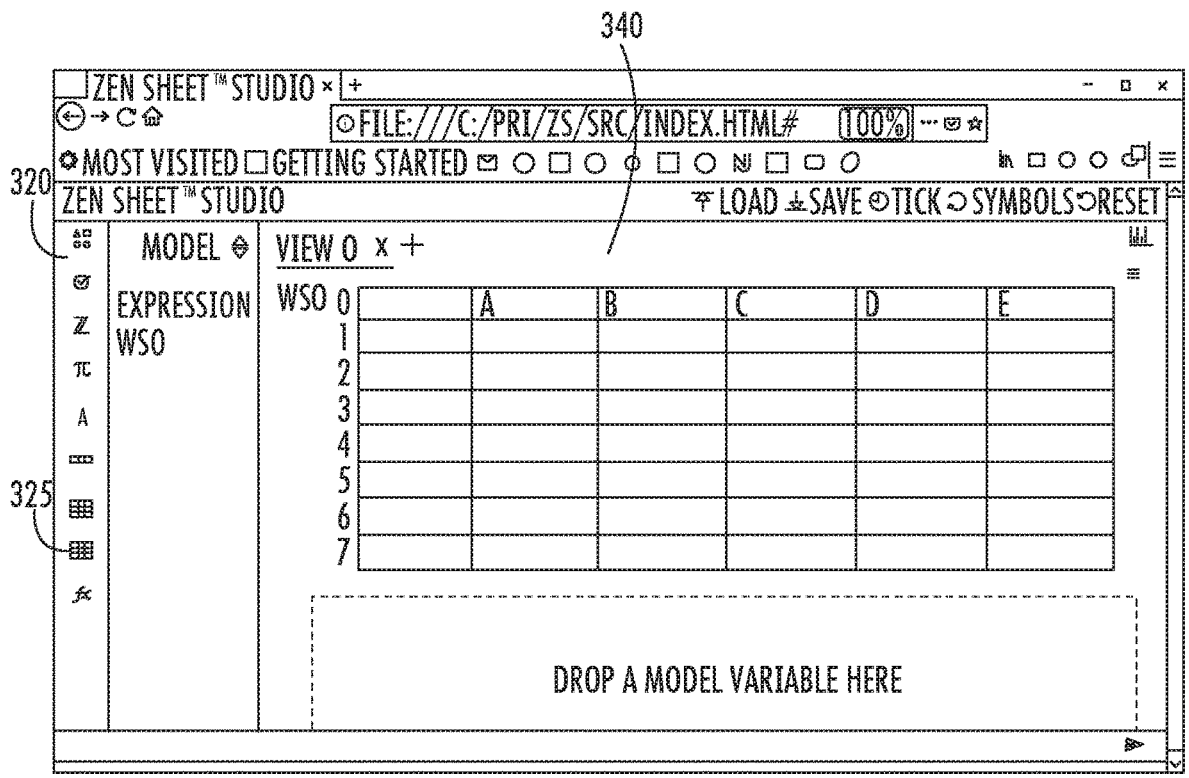

FIG. 4A shows a newly created worksheet, from which the user can add values and formulae just as with an MS-Excel worksheet into any "cell" in the array.

FIG. 4B shows a worksheet populated with formulae. Note the content of cell A2 is a formula: 2+noise( ) Function noise, when called, returns a random number between −0.5 and 0.5.

Figure 4C:
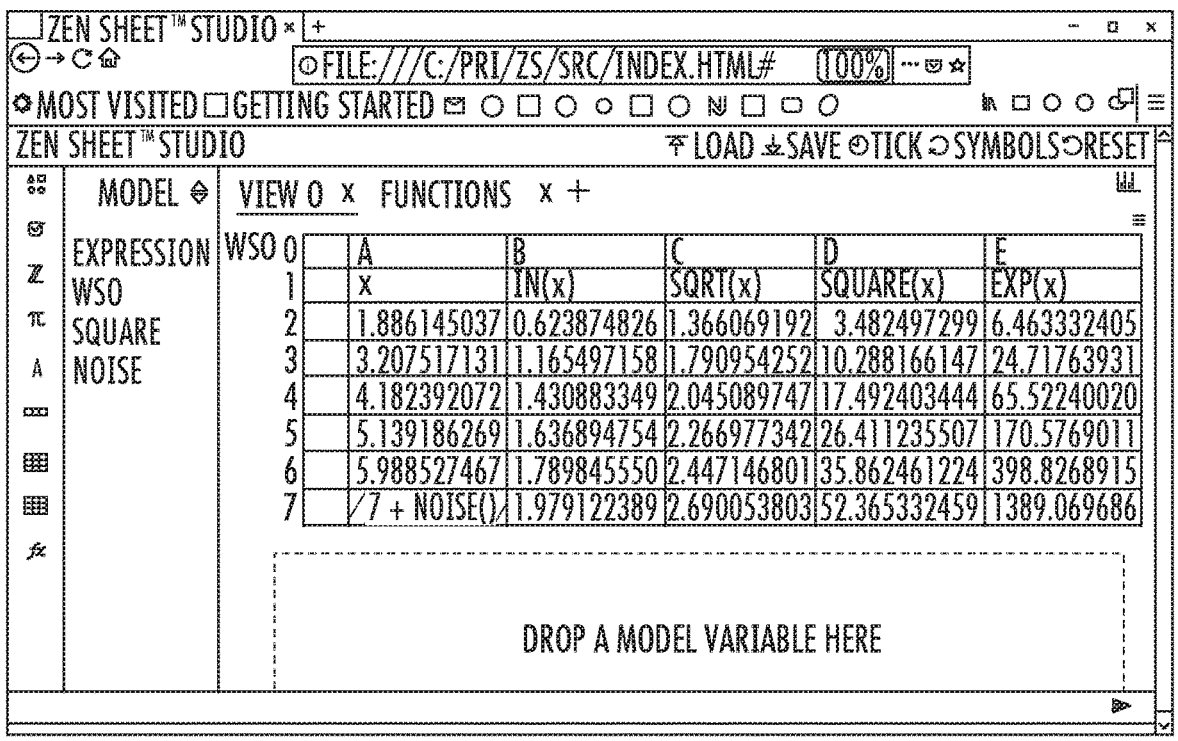
Figure 4D:
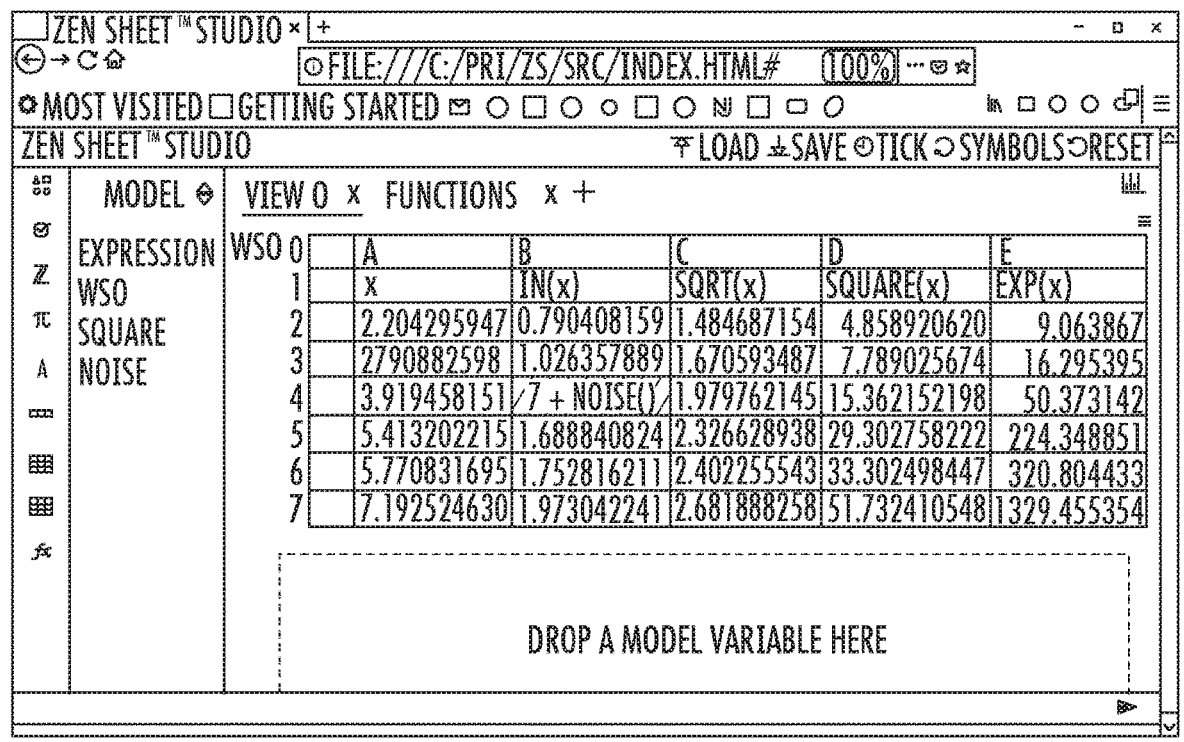
Figure 4G:
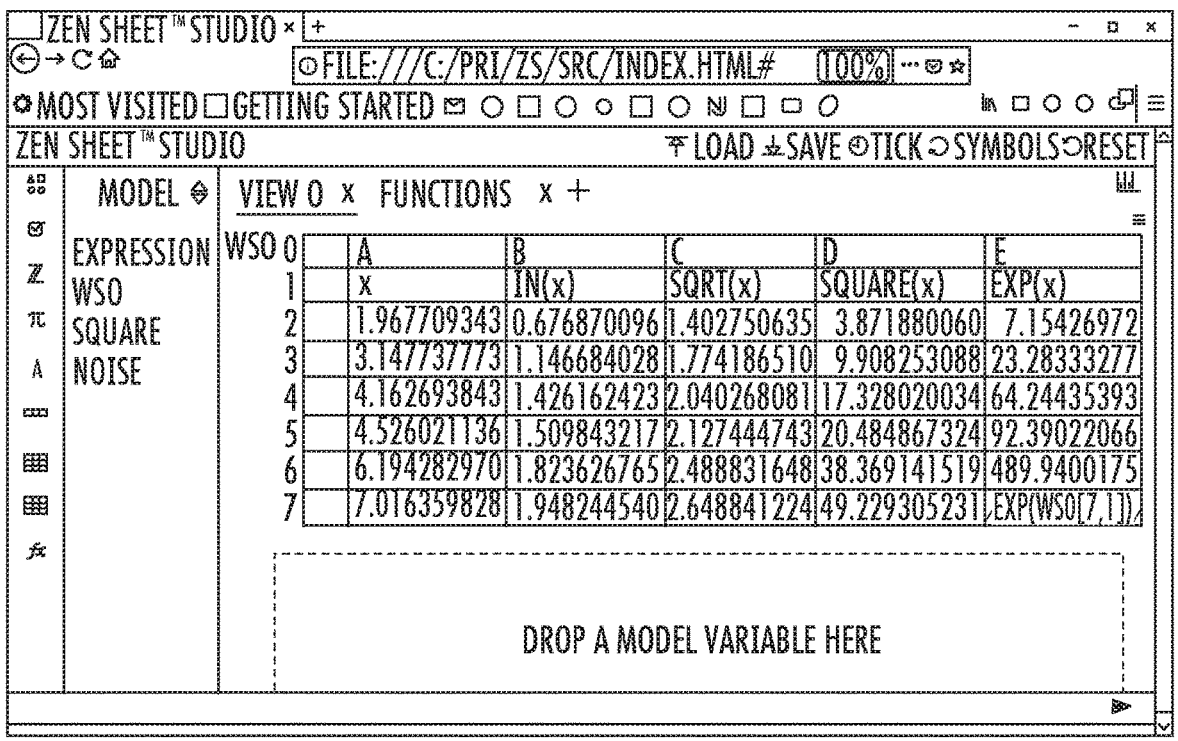

FIG. 4C shows cell A7 in the same worksheet being edited. Its formula is: 7+noise( ). Cells A2:A7 act as our input variables. Their value always equals the corresponding row number plus or minus the noise. Note that there is no need to add an equal sign in front of formulae in GRCSM—doing so is not encouraged, because it's a good idea to train users to regard formulae as values.

FIGS. 4D-4G show the content of various cells. Note the clear pattern: Each cell computes a function over the x located in the same row of the A column. For illustration purposes, the formula in cell E7 deliberately uses subscript notation instead of A1 notation. This serves to emphasize that worksheets in GRCSM are arrays of a certain type, as explained above, that support A1 notation.

Figure 4H:
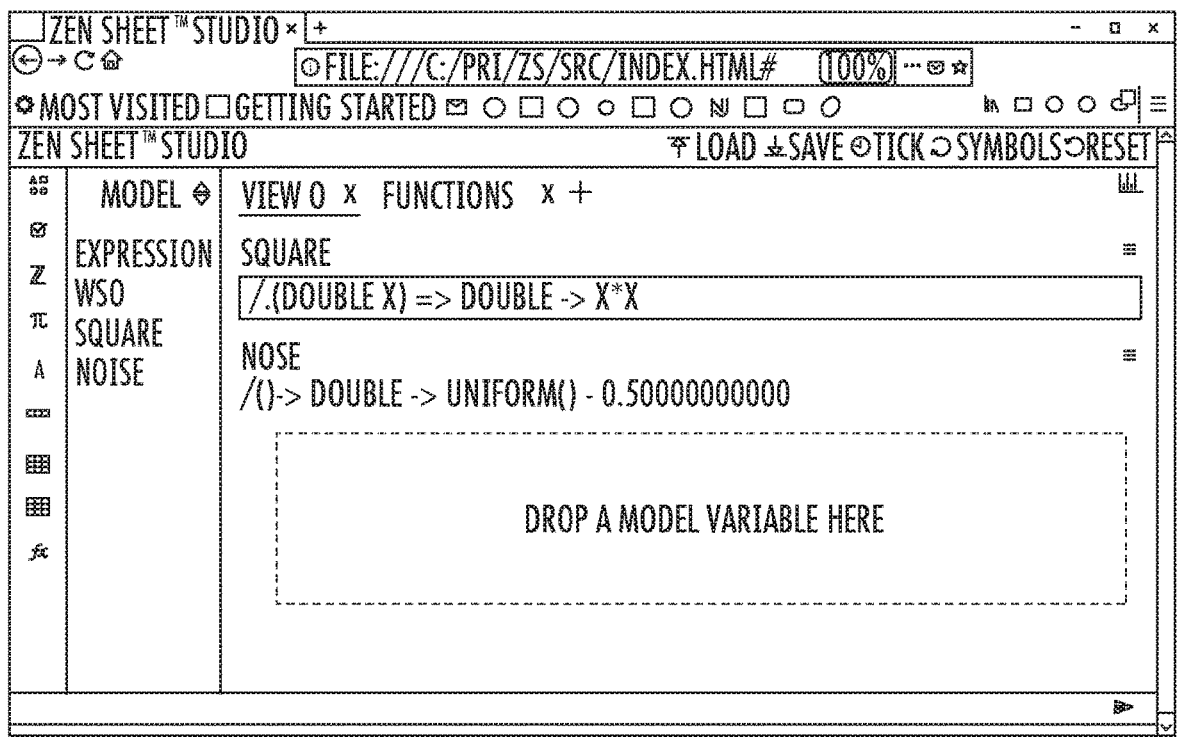

FIG. 4H shows that 'square' may not be a built-in function but a user-defined one. The content of the variable named 'square' can be read as "function that takes a double precision number x as argument and returns a double precision number according to the formula x*x". Note that square is just the name of the variable: it is the content of that variable, namely that 'function value', that provides the semantic of computing a square.

Variable 'noise' contains a function that takes no arguments and returns a random number as described above. Note that the built-in function 'uniform' returns a random number between 0 and 1.

User-defined functions are used just like built-in functions. Their body can rely on other functions, built-in or user defined.

FIGS. 4I and 4J implement a second worksheet, ws1, used for validation purposes. Note that ws1 can be shown on the same tab panel (as is the case here) on another tab panel, on both, or none. There is no entanglement between tab panels and worksheets. Column A in ws1 refers to the corresponding cells in ws0. The other cells compute the inverse of the function in the corresponding cell of ws0, which should yield back the x input, and then subtract x. If everything is correct, all those cells should be zero, save for very small loss of precision errors. That is indeed the case.

The intent of the last two figures is to show that worksheet formulae can refer to other worksheets, just like M-Excel™.

The example suggests a simple path to convert a traditional spreadsheet model 'S' into a GRCSM 'R' one:

For each worksheet in 'S' define a 2D array of lazy variants in 'R', with a suitable name.

Copy the formulae from each worksheet in 'S' into the corresponding cells in 'R'

This also shows that the GRCSM is at least as powerful as traditional spreadsheets.

5.2 Marketing Matching Example

With reference to FIGS. 5A-5I, and considering Example 2 from the Background discussion above, the following commands may be entered.

Replicating a traditional spreadsheet model can be a starting point, but the purpose of adopting GRCSM is to express the model in a more structured and clear way.

Hence a user of the GRCSM may start by defining the point concept, adding a Point type to the model. To keep the example shorter, the user may include the product/target name as part of the point. A more precise model may define Target and Product types as tuples that contain a point and other information. The user may define a variable as follows:

type Point:=struct {var name; var price; var quality; var design;};

That's the first data structure definition in this example. It is a type, not a variable. It describes what variables created as points will look like. A variable of type Point will include the packaging of four variables together. Each one of those four variables (known as struct fields or just fields) may have its own state and will be independently changeable, as it was the case with the corresponding cells of the original spreadsheet. There is no attempt to constrain name as a string and the other fields as double precision numbers: This is variant-based system with the addition of packaging variables together. That has significant ramifications. The GRCSM can operate at the field level but also with the point entity as a whole, for instance, passing entire points as arguments to functions, instead of having to pass each one of the components—contributing to the coordinate soup. Moreover, given a point p a user will be able to refer to its fields by their names, no matter where p exists. Those field names go a long way in eliminating the need for coordinates.

Figure 5A:
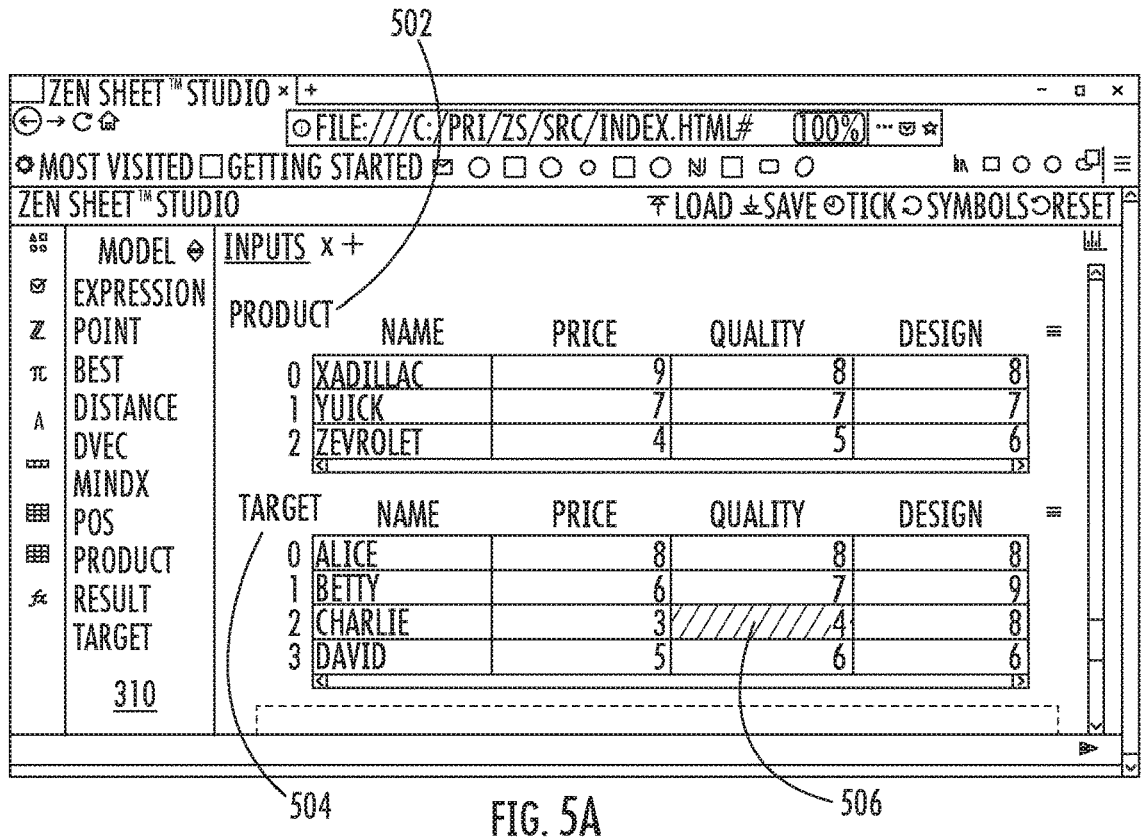

Also using GRCSM, a user can create "real" tables of points, not just "conceptual" ones mapped to a grid, and visualize them in any GRCSM panel. Indeed, other users can connect to the model and visualize the objects it contains as they please. FIG. 5A shows a panel showing the product and target tables 502, 504. Note that Charlie's "sweet spot" for product quality is being edited.

Figure 5B:
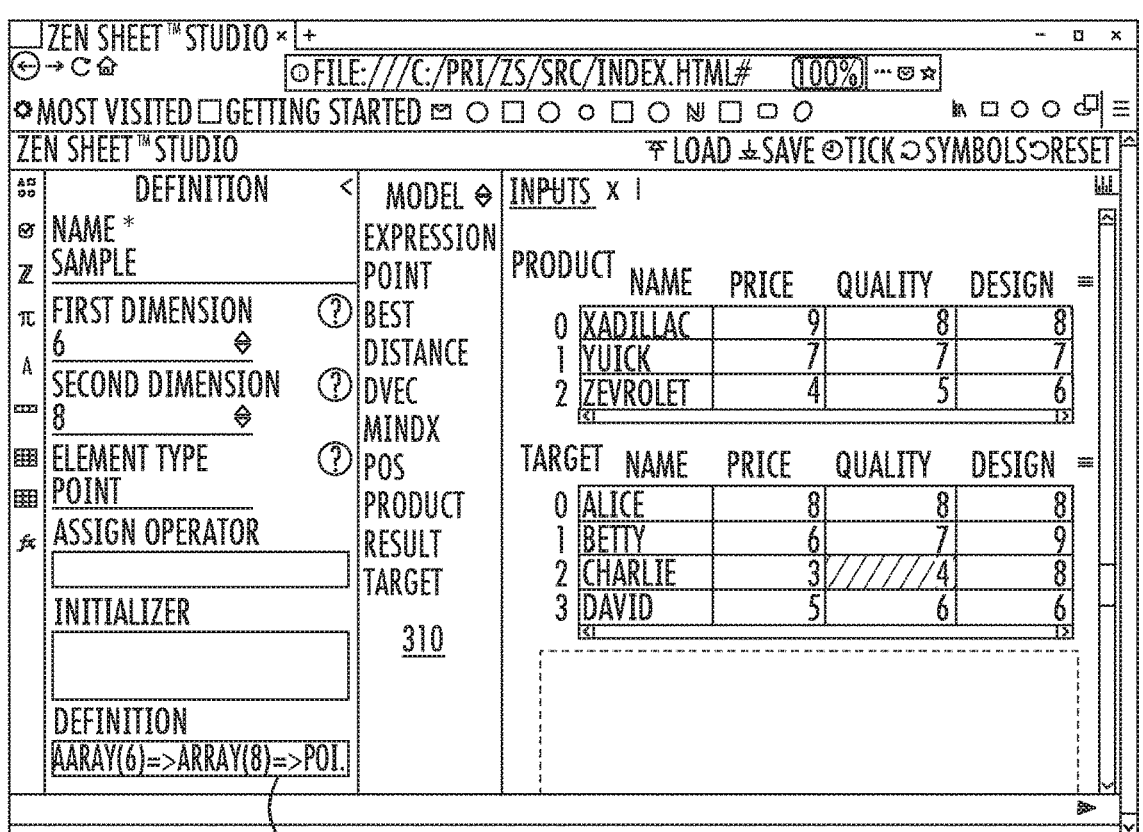

Variables of different shape and type can be defined via the command line (following the code syntax)—the preferred method of advanced users—or via the user-friendly dialogs provided for beginners. For brevity this example only shows how the user can define a table. As shown in FIG. 5B, note that the corresponding textual definition (in the code syntax) is automatically shown in box 508, to assist a beginner user in understanding the code.

FIG. 5B shows the product and target tables already created. Note the headings with the names of the fields in struct Point. The dialog on the left shows how to create tables like them.

To avoid repetitive formulae, like the ones in the MS-Excel™ spreadsheet a user may define the distance function.

Figure 5C:
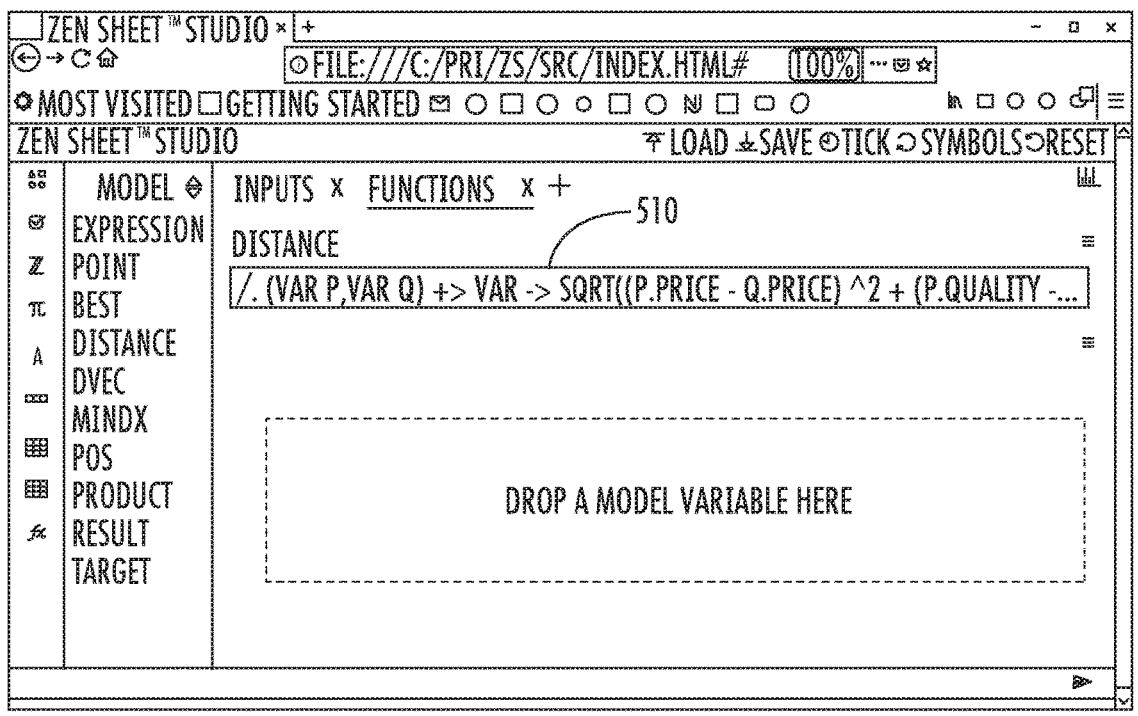

FIG. 5C shows the definition of variable distance 510 in the Functions panel added for the purpose of grouping functions. The definition is a function that takes two arguments, p and q and returns the square root of the squares of the differences between corresponding fields (price, quality, design) of the points p and q.

The code representation of the definition of distance would be as follows:

var distance:=/.(var p, var q)=>var→
sqrt((p.price−q.price)^2+(p.quality−q.quality)^2+(p.design− q.design)^2);

Note that the arguments are of type var, so they could in principle be anything, but are intended to pass only points as parameters, hence the use of expressions like p.price to denote the price field of point p that make the definition of the function more clear.

Moreover, once this function is defined, it can be called by, say, distance(target[0], product[2]) to compute the distance between Alice's sweet point and the Zevrolet product. As long as the distance function is called with point values, it will function as intended. The GRCSM may statically (i.e. before the model runs) verify type consistency if it receives accurate type information. Programming with variants enables rapid prototyping, but as models grow, it is warranted to declare types more specifically, to let the GRCSM catch errors before the model is evaluated.

Given a target, it may be useful to be able to get a vector of distances from that target to all the products, to find the one with the minimum distance.

Figure 5D:
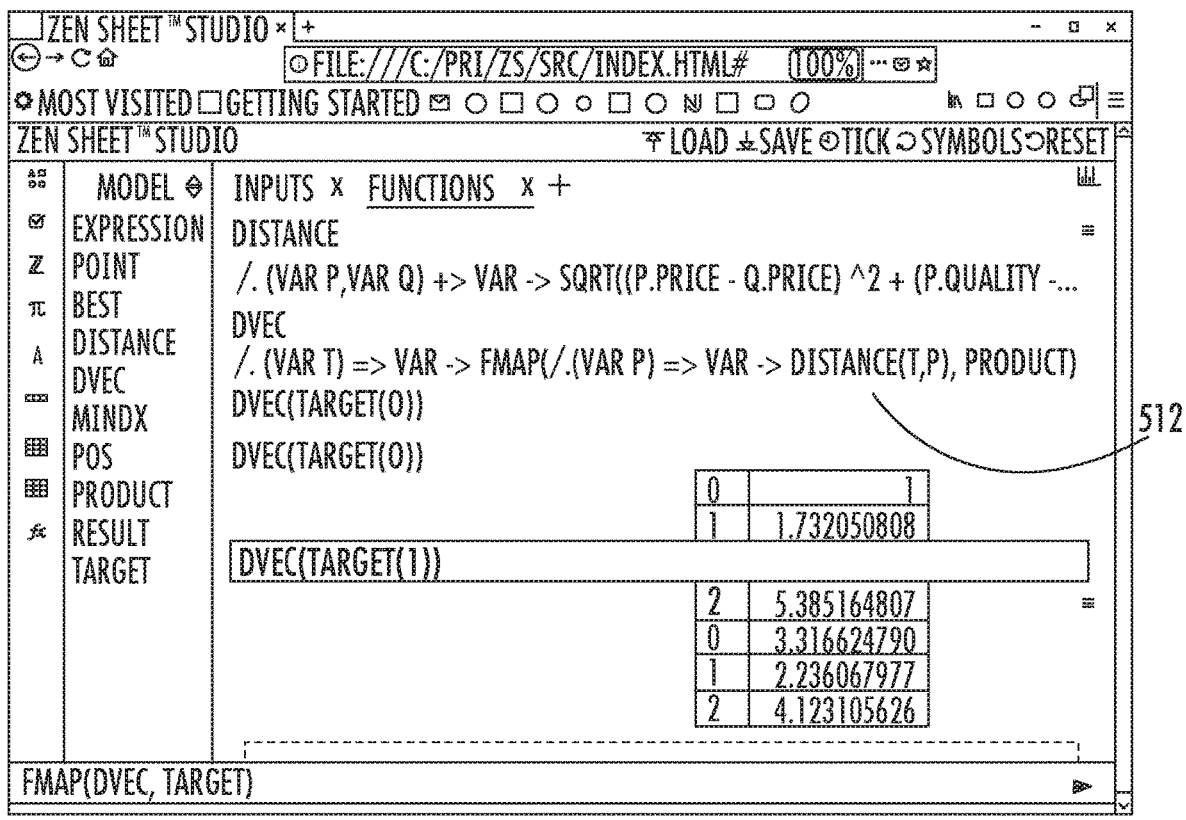

FIG. 5D shows the definition of the dvec function 512, as follows:

/.(t)→fmap(/.(p)→distance(t, p), product)

Given a function f that takes one argument, and an array A, fmap(f, A) returns (computes) an array that contains the result of applying function f to each element of the array, i.e. [f(A[0]), . . . f(A[n−1])]

For instance: fmap(/.(x)→2*x, [0, 1, 2, 3]) yields the value [0, 2, 4, 6]

Function dvec takes one argument (expected to be a target) and returns the value of the expression fmap(/.(p)→distance(t, p), product)

Note that /.(p)→distance(t, p) computes the distance from t to p, where p is an argument and t comes from the enclosing function. The fmap function applies this function to each element in product. Thus the definition of dvec is as follows: Given a target t, dvec computes an array where each element is the distance from t to a product.

Figures 5E, 5F:
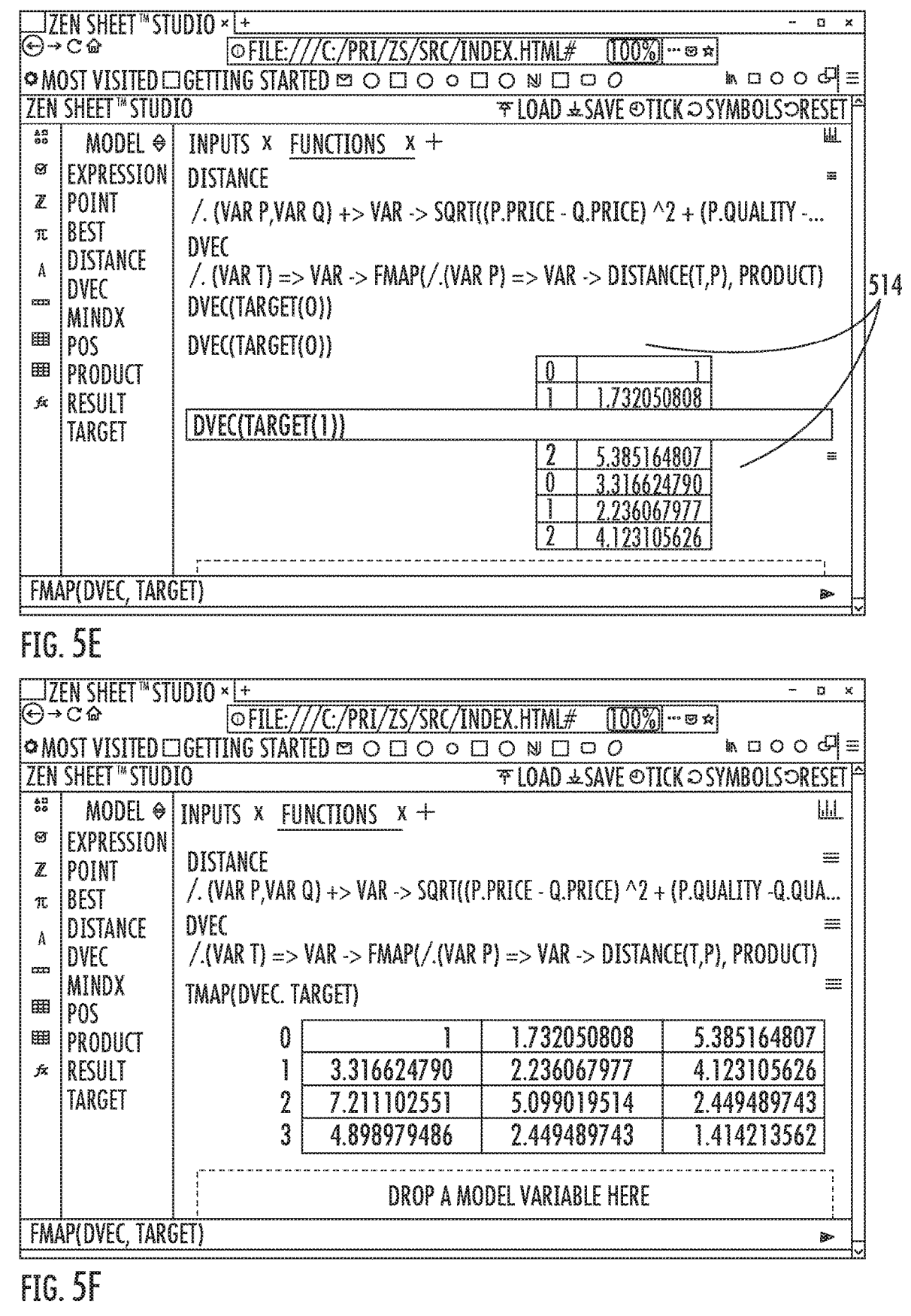

FIG. 5E also shows how evaluation arbitrary expressions using the visual client. A user can drag and drop the Expression text in the model list and type an expression. By doing so they can verify manually that dvec(taget[0]) and dvec(target[1]) yield distance vectors 514.

FIG. 5F shows how the same technique can be used to check the entire distance matrix. This can be accomplished with an application of the dvec function to each target, and the fmap function can be used to evaluate fmap(dvec, target) and see the entire distance matrix rendered on the panel.

For each target t, the position of the minimum value in dvec(t) may be determined and position of the minimum value may be used to retrieve the product p that has the minimum distance to t.

FIG. 5G shows the function mindx defined as /.(var vec)=>var→pos(min(vec), vec, 0), which reads as "given a vector vec, find the position of the minimum element of the vector, inside the vector itself, starting at position 0." The function may be seen as pos as /.(var x, var vec, var i)=>var→if(x=vec[i], i, pos(x, vec, i+1)), which reads as "given a value x, a vector vec, and a position i, if x equals the value of vec at position i, return i itself, otherwise return the position of x in vector vec starting at i+1 (the next position)." This definition will go out of range if x is not found but is adequate for this example, because x must be always found: It is the minimum value of the vector itself and, even though it is a double precision number.

Armed with mindx (min index). The expression product [mindx(dvec(target[0]))].name may be evaluated.

Figure 2:
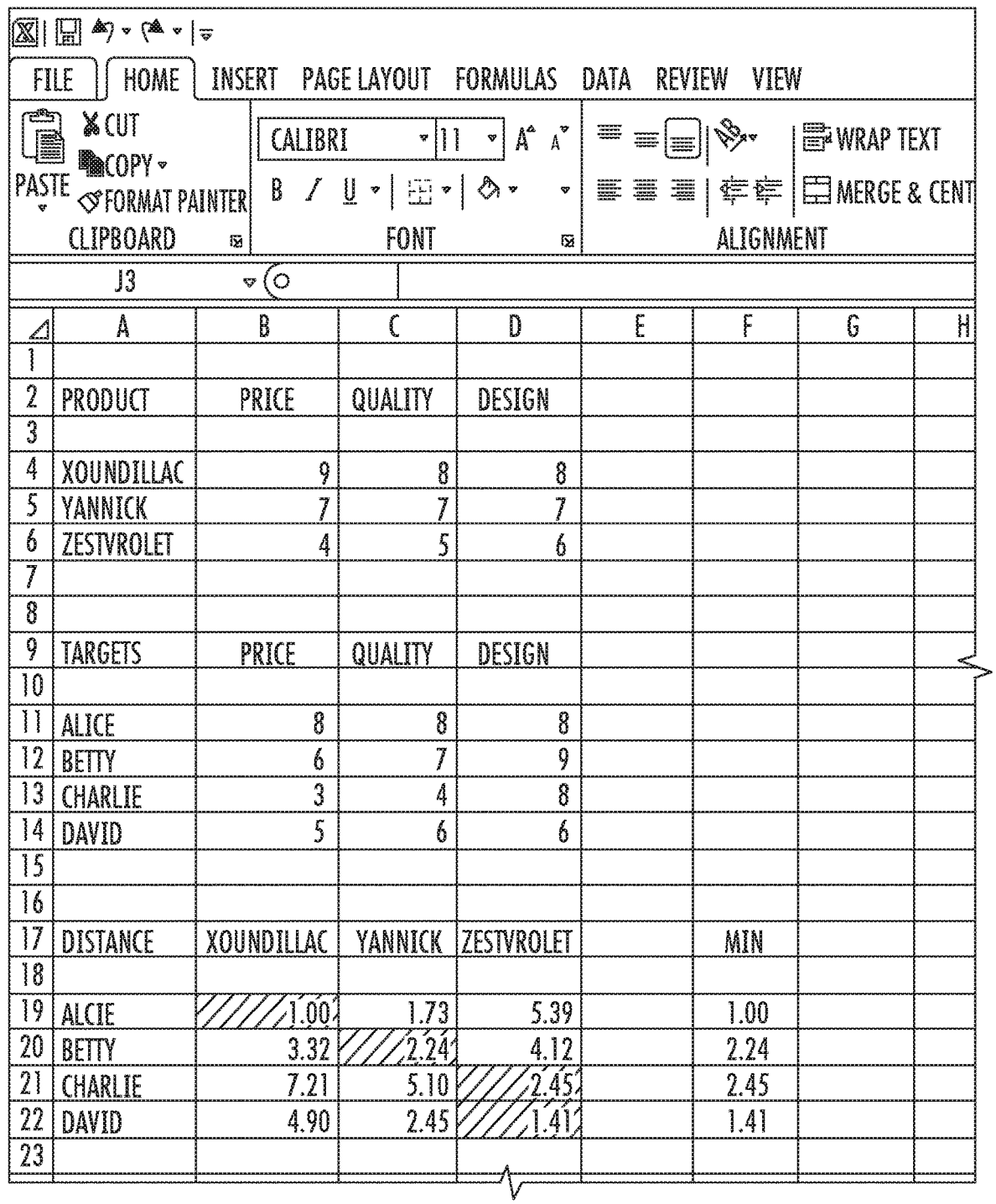
FIG. 2 shows an example of a traditional spreadsheet for marketing matching.

Reading from inside out, target[0] (Alice) distance vector may be computed, find the index of the minimum distance value, and use that index to retrieve the corresponding product in the product table. And then the name of the product may be shown, and the result can be compared to FIG. 2.

In FIG. 5H, the user has generalized the expression just tested and use it to define function best as /.(t)→product [mindx(dvec(target[t]))].name, which reads as "given a target t, compute the name of the best match. As explained before, the expression (product[mindx(dvec(target[t]))].name) does just that.

Figure 5I:
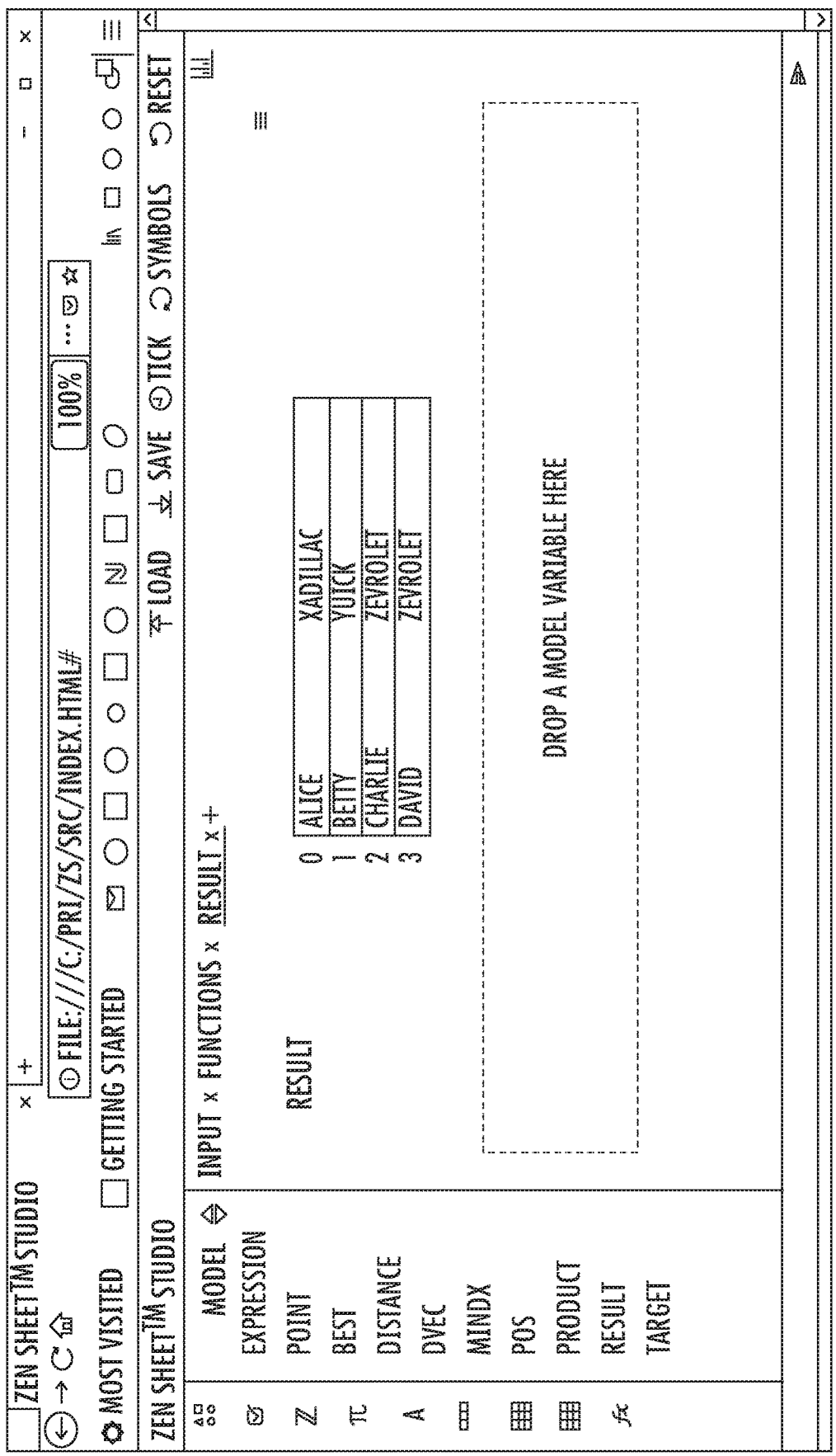

FIG. 5I puts all this together applying best to each target, to show the result: the table of preferred products by target customer.

5.3 Real Time Matrix Multiplication Example

This example shows the advantages of the GRCSM when dealing with arrays that dynamically change size.

The model example is a stochastic simulation defined as follows:

Two matrices of uniformly distributed random numbers are generated and multiplied. The number of rows and columns of each matrix are also randomly generated, within user defined constraints. According to the mathematical definition of matrix multiplication, two matrices, A and B, can be multiplied only if the number of columns of A equals the number of rows of B. Therefore, the model defines a tuple that holds three integer numbers: M, K, N. Matrix lhs (named from "left hand side") will have size M×K and matrix rhs ("right hand side") will have size K×N. Note that the values of M, K, and N vary randomly during the simulation, generating matrices of different sizes, populated with random numbers, as desired.

This may be coded in GRCC as follows, with explanations.

::Row:=/.(int N)=>array[ ]=>double→if(N=0,[ ], cons (uniform( ) Row(N−1)));

::Matrix:=/.(int M, int N)=>array[ ]=>array[ ]=> double→if(M=0, [ ], cons(Row(N), Matrix(M−1, N)));

Variables Row and Matrix hold the matrix construction functions. Calling Row(n) returns an array of n uniformly distributed random numbers. Matrix(m, n) returns a matrix of size m by n. In this example matrices are represented as arrays of arrays, rather than 2D arrays. The difference between the two representations is irrelevant for the example. Matrix(m, n) generates a matrix of the size given as call arguments.

::irand:=/.(int min, int max)=>int→int((max−min+1) *uniform( )+min;

The irand function generates a random integer between the parameters min and max, both ends included. It's easy to verify mathematically that if uniform( ) returns a random number between 0 and 1 (that's what the function uniform does when called with no arguments, following the definition of a standard uniform distribution in statistics, then irand computes a random integer between min and max. Note that int(x) truncates the value of x to the nearest integer k such that k<=x.

::tuple (irand(6, 8), irand(2, 4), irand(4, 5));

As explained herein, the values held by variable tuple must change during the simulation, hence tuple is implicitly defined as lazy (note the use of:-instead of:=assignment operator) which means it holds a formula that's re-computed on each simulation cycle. Input matrices lhs and rhs, as well as res (result) are lazy as well. When using The GRCSM Studio to define a variable, the user can make it lazy by simply checking the lazy checkbox in a definition dialog.

::lhs Matrix(tuple[0], tuple[1]);

::rhs Matrix(tuple [1], tuple [2]);

In the example shown, the first element in variable tuple will randomly be 6, 7, or 8, the second 2, 3, or 4, and the third 4 or 5. The formulae used for lhs and rhs rely on those values, retrieved using subscript notation of the form tuple [i], to create matrices with constrained (and multipliable) random sizes.

::res mmult(lhs, rhs);

Function MMULT multiplies the lhs and rhs matrices.

Function MMULT (matrix multiplication) is also found in MS-Excel™, where it is meant to be used as an array formula and in Excel™, the user must:

1—select a range of cells in a worksheet

2—enter the desired MMULT(A, B) formula in the formula editing box

3—press Ctrl-Shift-Enter (together) to indicate that the formula covers the selected range It follows that the user must determine the size of the resulting matrix in advance. In the GRCSM example, by definition, the size of the input matrices varies, and so does the result. Excel™ simply cannot express this model in a natural way because it does not really support arrays, and nor do other spreadsheet programs. Excel™ only supports the notion of mapping the result of a formula [1] to a region of the worksheet; The worksheet being the one "truly" supported data structure of traditional spreadsheets. But this hack can only take a user so far. Apple Numbers™ does not fare better: It also supports just one data structure, the table, which can change size dynamically only in one direction: by adding or removing rows. Moreover, Apple Numbers™ does not support any matrix functions.

The GRCSM type system truly supports data structures, like arrays, structs, and tuples. The supported data structures are fully composable: i.e., can be arbitrarily nested. Moreover, the GRCSM manages to do all this in a way that is consistent with the formula-based reactive nature of spreadsheets. For added compatibility with traditional spreadsheets, The GRCSM even supports A1 notation to refer to cells.

FIGS. 6A-6I show an example of how to perform the matrix multiplication introduced herein within the client. A detailed description of the client interface follows in is shown in FIGS. 3A-3C but this example can be understood here.

Figure 6A:
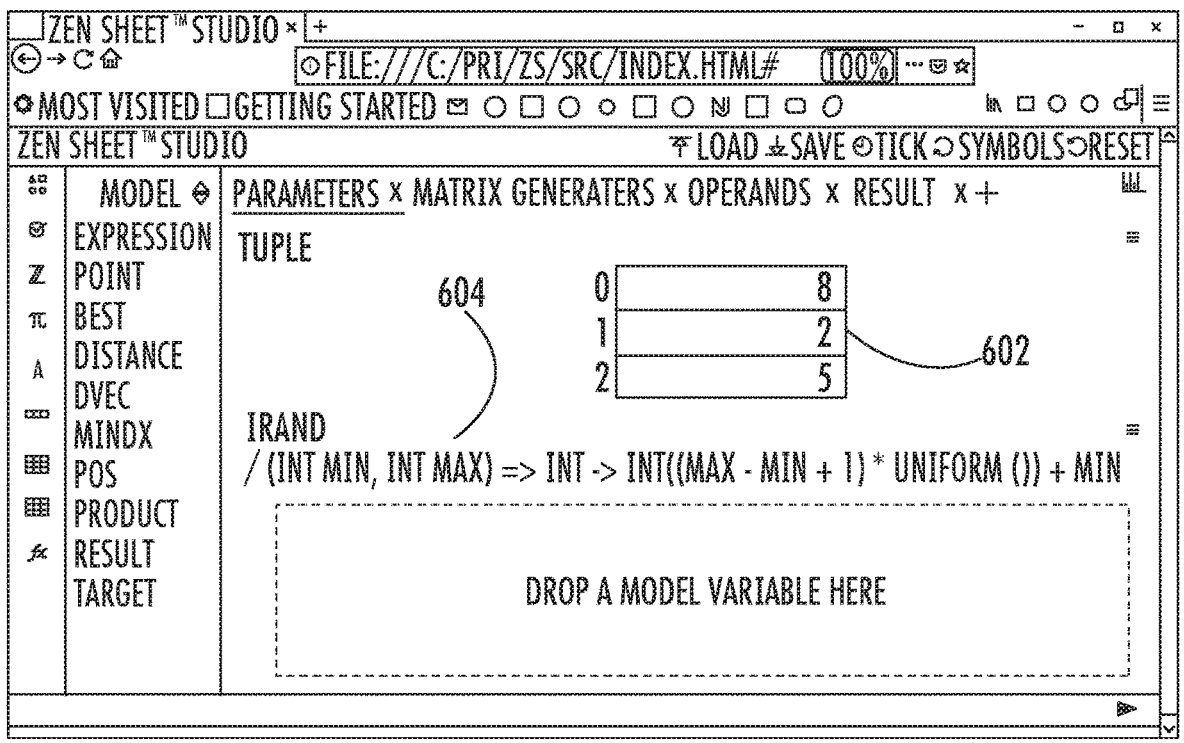
FIGS. 6A-6I show a matrix multiplication example using the GRCSM Client.

FIG. 6A shows the input parameters of the simulation, i.e. the tuple 602 that specifies the size constraints of the randomly generated input matrices. It also shows the definition of the irand function 604. Note that the tuple is a simple but useful data structure, not supported by traditional spreadsheets, and that the user defined irand function is simply a variable that contains a function value; i.e. a value of type function. Function values are what permits to define new functions without resorting to out-of-core spreadsheet mechanisms.

Figure 6B:
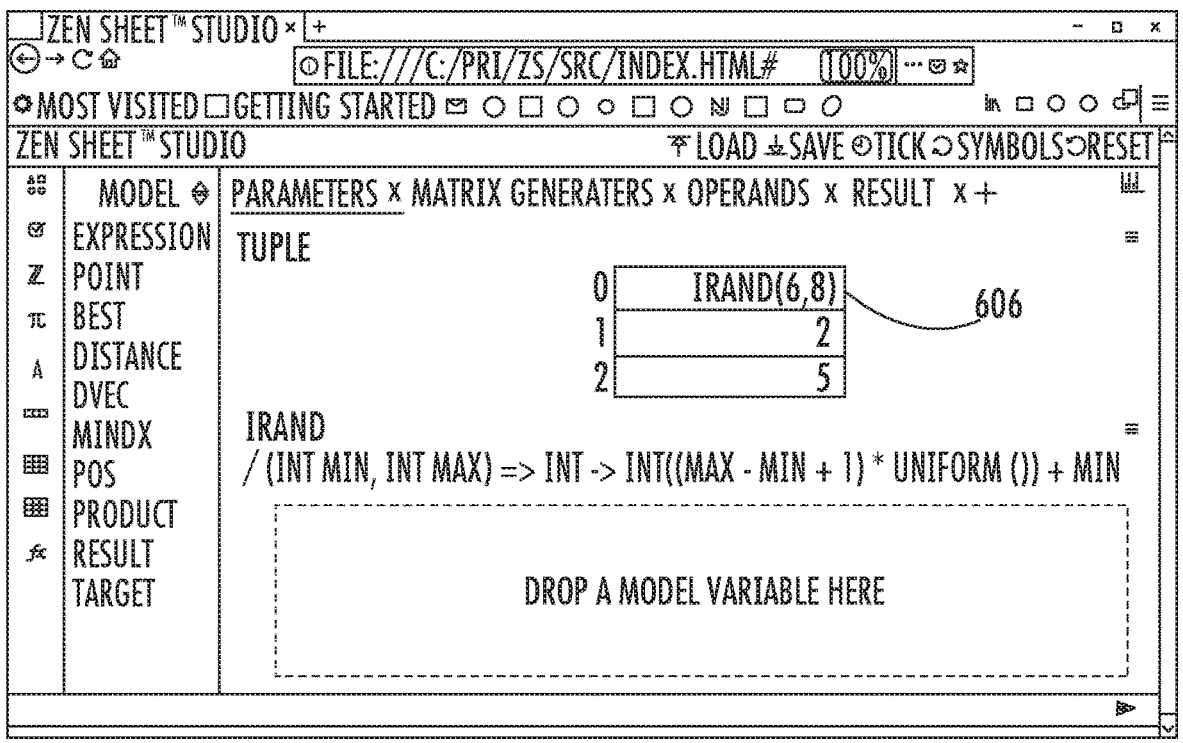

FIG. 6B shows the same panel, while editing the first element of variable tuple 606. The content of tuple[0] is irand(6, 8), i.e. an invocation to function irand. Looking at the definition of the irand function, the GRCSM engine concludes that the invocation will yield a value of type int. The type of variable tuple is not explicitly defined—indeed the double colon means "infer the type"—but the expression that initializes the variable is a struct with three nameless fields, each one being a formula that returns an int value. A struct with fields that have no name is known as a "tuple" in the GRCSM. Note that the word "tuple" is used here with two meanings: is the name of the variable itself, but also used to refer to a record of unnamed fields. The GRCSM engine concludes that tuple is a 3-element tuple of lazy ints.

Figures 6C, 6D:
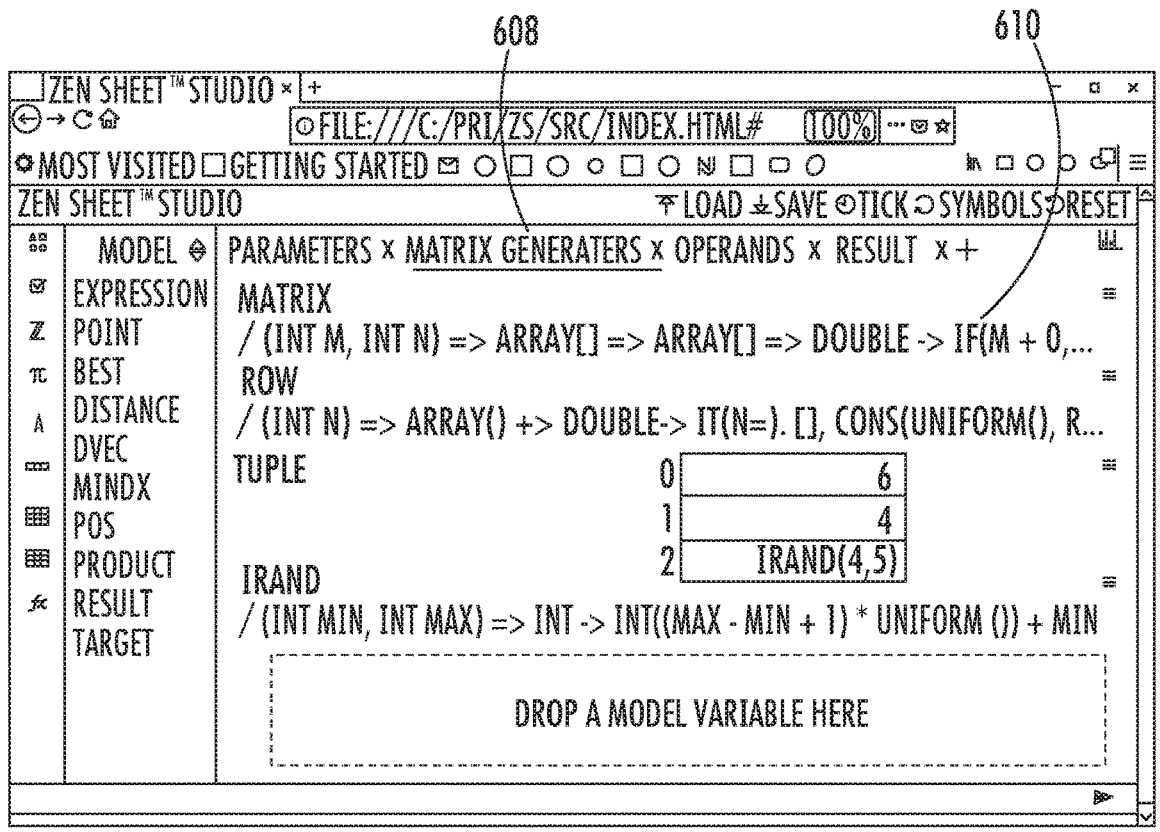

FIG. 6C shows the variable view panel for the worksheet labeled "Matrix Generators" 608: The collection of variable definitions that are relevant to the generation of the input matrices lhs and rhs. For the sake of brevity, and avoid turning this case study into a lengthy computer science lesson, this example will skip over the definition of functions Row and Matrix, except for repeating what was stated at the beginning: invoking Row with an argument of value n, i.e. using the expression Row(n), returns an array of n elements, each one being a random number between 0 and 1. Function Matrix 610 returns an array of rows, specifically, the expression Matrix(m, n) yields as a result a matrix with m rows, each one with n elements. Note that the panel also shows variables tuple (in this case with the third element being edited), and the function irand. Those are the same objects shown in the Matrix Generator panel, which means that changing any variable in the sheet changes it throughout all sheets functions and variables, avoiding the intern issue described above. This demonstrates proper separation of model and visualization in the GRCSM. Said another way, editing tuple (or any variable) in either panel affects the one and only variable tuple in the model, as it should be.

FIG. 6D shows the "Operands" panel/worksheet 612 with the input matrices: lhs 614 and rhs 616. IT should be appreciated that these matrices are being updated at a preset and programmable time interval with the randomly generated numbers, and to see them on the screen, both the contents of the matrices, i.e., the value of each row and column, as well as the size of each matrix (the numbers or rows and columns) is constantly changing within the parameters in the table above.

Figure 6E:
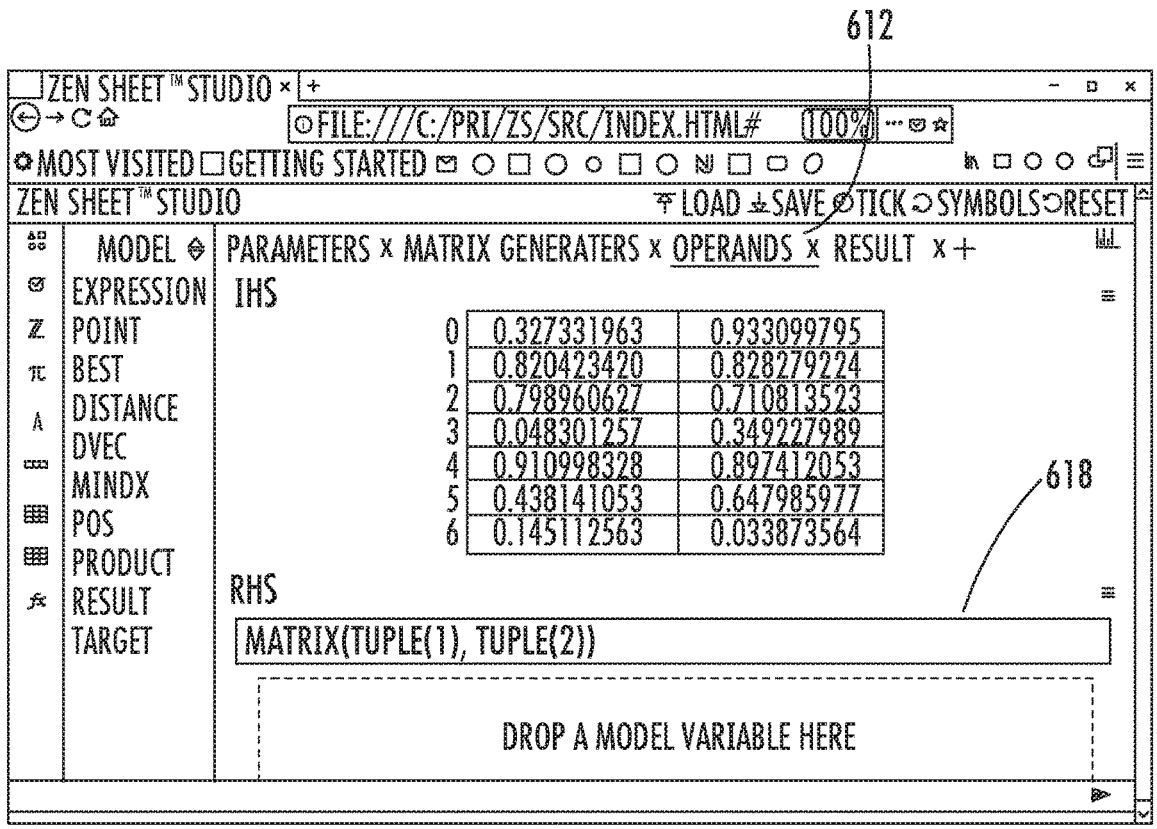

FIG. 6E also shows the "Operands" panel 612, while editing the formula for rhs 618, for demonstration purposes. Note how tuple[1] plays a role as the number of columns of lhs and the number of rows for rhs. Looking at the snapshot, it can be seen that, at the moment of the snapshot, tuple[0] returned 7 and tuple[1] returned 2, since the lhs matrix is 7×2. The value returned by tuple [2] is not known but by its formula, it must be 4 or 5, and therefore rhs must be a 2×4 or 2×5 matrix. The result matrix, res, must be 7×4 or 7×5 matrix.

Figure 6F:
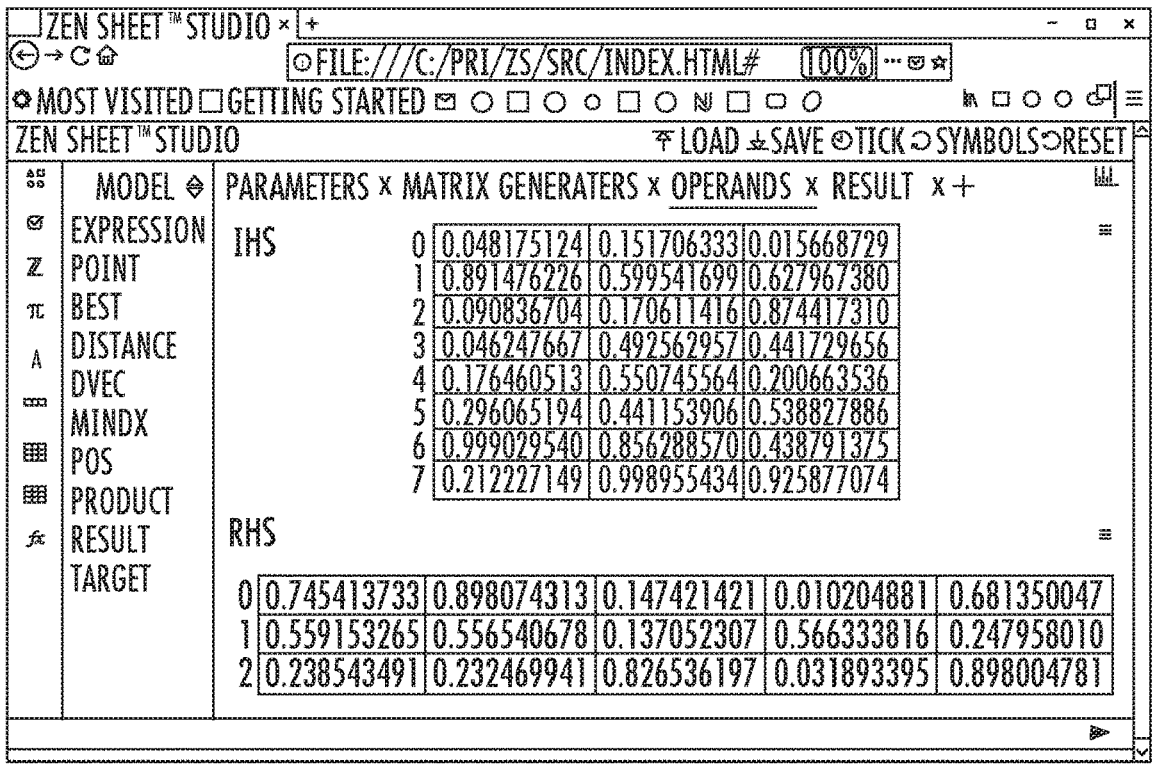

FIG. 6F shows the "Operands" panel again, at different time, to emphasize its changing nature of the matrices.

Figure 6G:
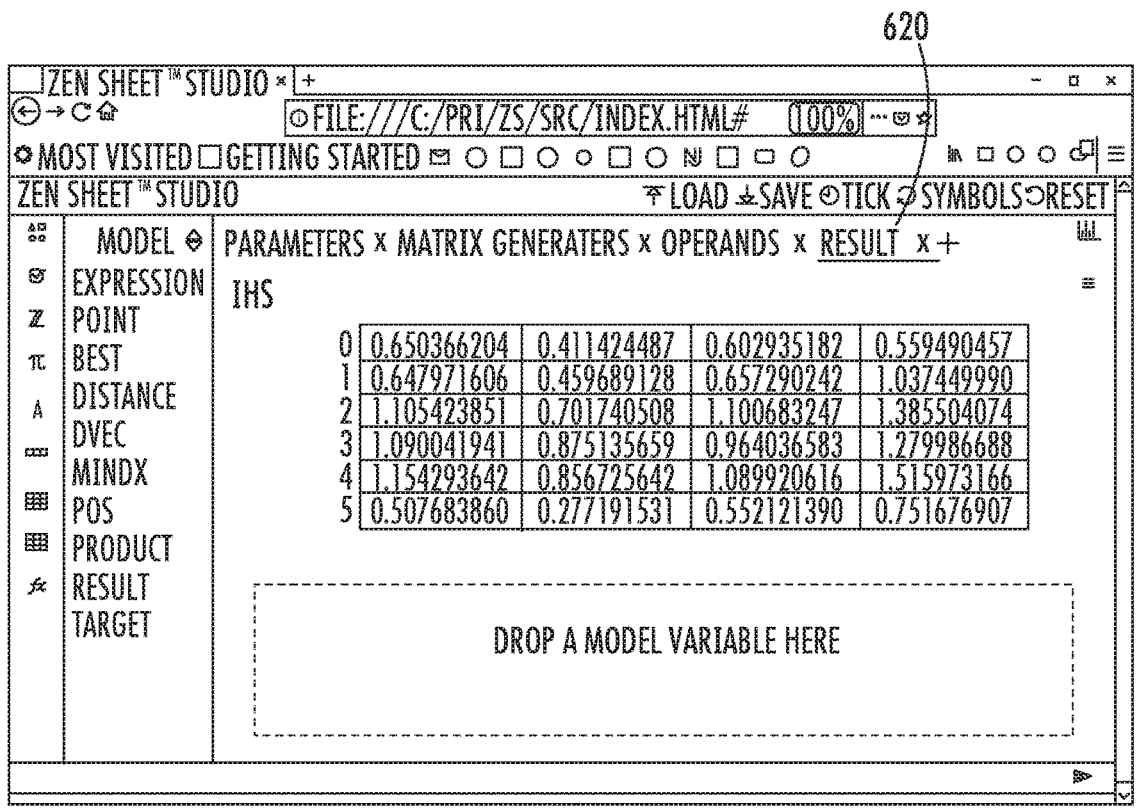

FIG. 6G shows the "Result" panel 620, which was a 6×4 matrix at the moment of the snapshot, but could be any of the MMULT combinations of lhs and rhs.

Figure 6H:
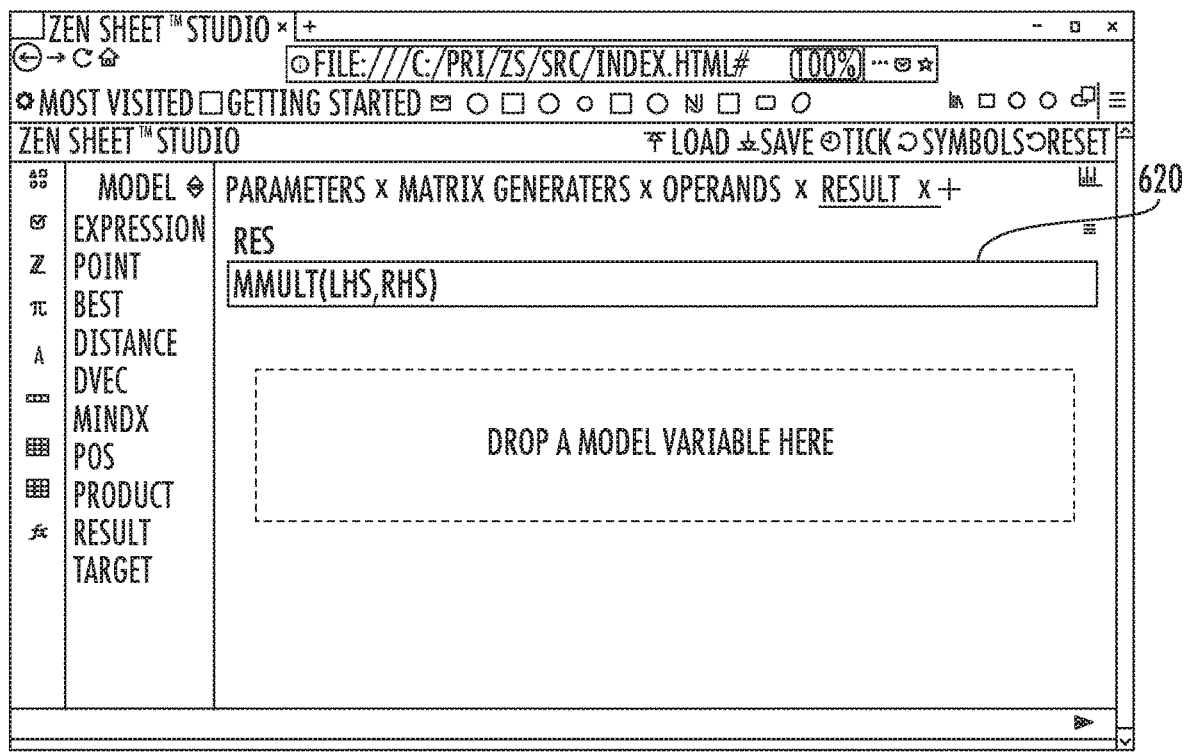

FIG. 6H shows the formula of the res variable 622: Note how the names of the matrices make the spreadsheet easier to read and understand, as opposed to having to dig into ranges of worksheet cells asking, "What was $A4:$C7?" And even using traditional sheets, a user could only wish for the input ranges to be variable in size because it would not be possible, but it is in the GRCSM. The usual workaround for this class of problems, when dealing with one-dimensional arrays, is to define a very long array as the resulting range, and use IF expressions throughout, forcing an ignoring of cells that are "out of (the conceptual) range". For instance, a user may have a refinancing model comparing a 20-year mortgage with a 30-year mortgage. A typical reusable spreadsheet, written by an accomplished traditional spreadsheet user, will likely define a 30-year (or even 50 years) area for the cash flows—and "sprinkle" IF expressions in the array cells formulae to exclude those exceeding the length of the corresponding mortgage from the computation, say, by returning zeroes for cash flows. These workarounds obscure the model more and greatly increase the chances of introducing errors.

In the case of matrix multiplication, even the traditional spreadsheet workaround described above is insufficient: you cannot, for the sake of the example, simply multiply two "oversized" 30×30 matrices, who actually hold two 10×10 matrices (the real input) located towards the upper left, zeroing all other cells, and pretend that the result of MMULT is located in the 10×10 upper left area of the 30×30 matrix computed by MMULT: It does not work that way. The tricks get ever more complicated and impractical. At this point, any serious financial practitioner will tell you that you should use MATLAB, R, or another tool that can handle this class of simulations, with one caveat: They do not behave like spreadsheets, requiring a different programming style and deeper level of expertise.

There is no sane substitute for spreadsheets supporting true arrays, and other essential data structures like structs, directly in the modeling language, and not as a grid-mapping hack.

Figure 6I:
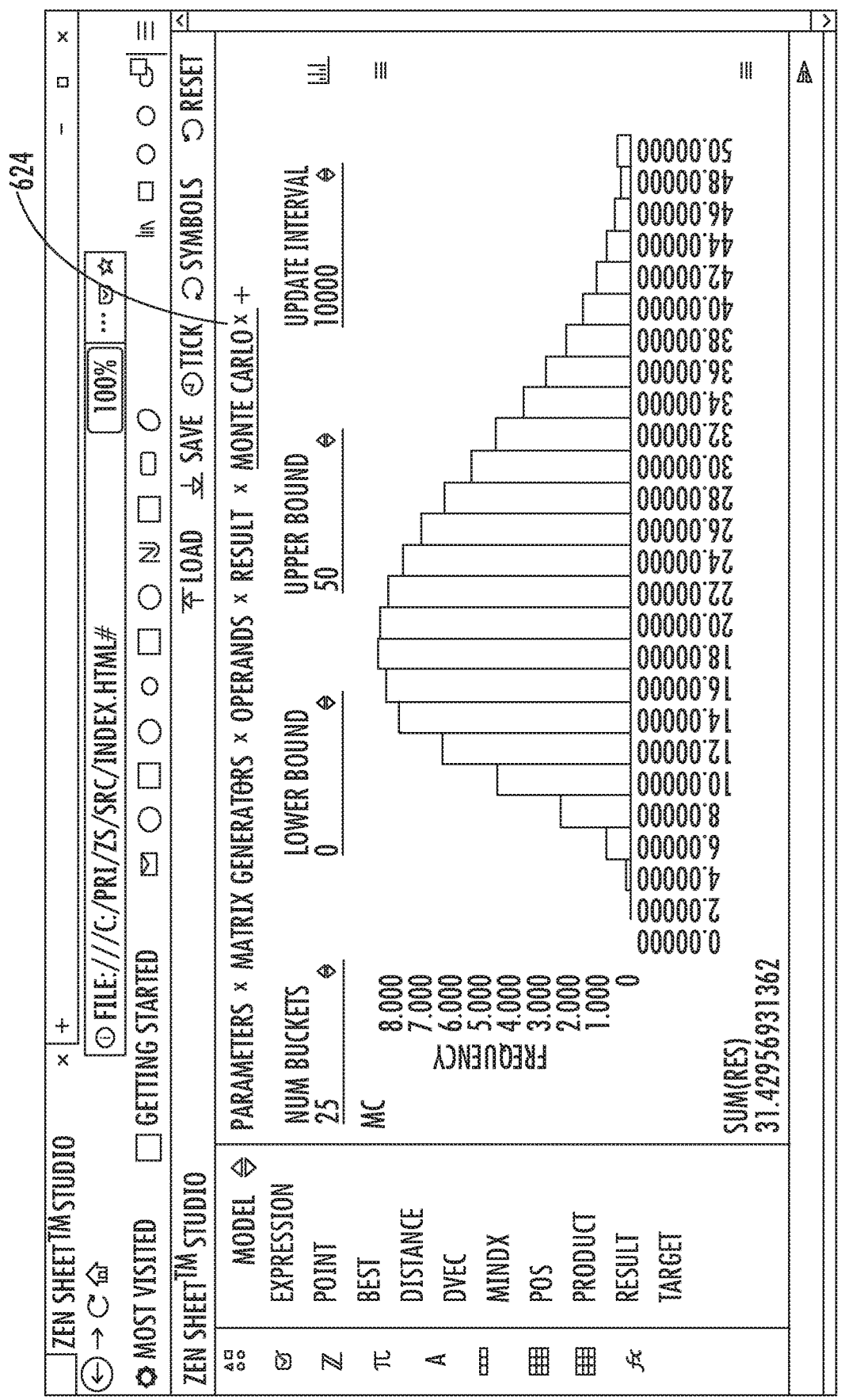

FIG. 6I shows the result of performing a Monte Carlo simulation 624 with the expression sum(res), i.e. the sum of all the elements in the resulting matrix res. A basic Monte Carlo simulation is easy to setup in the GRCSM, by simply adding numeric variables or numeric valued expressions to the variable view panel area of the Monte Carlo panel and requesting a number of evaluations of the model (i.e. number of samples) along with the number of evaluations used to send partial results (usually tuned to avoid boredom). The user may also want to specify a domain range for the histogram and the number of bars to display. A detailed explanation of the Monte Carlo functionality offered by the GRCSM would be beyond the scope of this patent application, however, the fact that the GRCSM, unlike traditional spreadsheets, integrates Monte Carlo simulation capabilities directly in the compute engine and not as an add-in, makes simulations faster than traditional spreadsheets.

6.0 Reactive Client

The Reactive Studio Client 180 is the web client responsible for delivering a friendly interaction with the GRCSM Server 170. An intuitive, spreadsheet-like, modeling experience aids in user adoption and is described below in more detail.

The Reactive Studio Client 180 uses various AST-driven heuristic rules to decide how to display model objects on the screen. Lazy variables need different handling for rendering values and editing formulae. For value rendering purposes, the layout is determined by the static type of the value (r-type), complemented with an analysis of the value itself (r-value), or a portion of it in the case of large data structures. For editing purposes, the type of the variable (l-type) is needed, instead of the r-type.

7. GRCSM Tools

The GRCSM may provide the simple functions of spreadsheets, some of which the earlier description discusses, but also more advanced tools may also be available.

7.1 Wide-Spectrum Spreadsheet Tool

As a generalized spreadsheet environment that supports built-in functional extensibility, unfettered data composition, and clean separation between the computational (expressed visually in the variable panel 310, command line 330 in the client 300) and visualization models (variable view panel 340), making it a visual and interactive software development tool in its own right.

By supporting traditional spreadsheet notation (in the form of a created variable array with column-row notation) and user interface constructs, while generalizing the same in a way consistent with modern software development tools, the GRCSM facilitates the conversion of traditional spreadsheet models into equivalent ones that are more understandable, flexible, and maintainable. The GRCSM can thus import traditional spreadsheets in column-row notation, with each sheet importing as a single variable (viewable as such in the variable panel 210 in client 300).

The GRCSM thus provides a gradual path towards the elimination of the "coordinate soup" problem that affects legacy spreadsheets. User assistance to the process largely consists of giving intuitive names to the data structures implicit in a spreadsheet model. The structures may be manually or automatically identified, via analysis of the visual spreadsheet layout as well as its computational graph, i.e. cell values and formulae. The conversion process can also make the resulting spreadsheet a better performing one, thanks to the exploitation of inferred data types in the compilation and optimization process.

The GRCSM provides a general-purpose computing environment that supports a functional reactive programming style augmented with imperative programming extensions. The imperative extensions are consistent with the core spreadsheet functionality. This consistency, not encountered in current spreadsheet products, is what makes the GRCSM a wide-spectrum computing tool, amenable to casual spreadsheet users, accomplished spreadsheet practitioners (e.g. business analysts), and software engineers.

7.2 Real-Time Data Processing and Analysis Tool

The GRCSM supports zoom-in and zoom-out capabilities: i.e. the ability to drill down nested data structures and come back. As the user navigates, the GRCSM keeps rendering real-time updates in the currently visualized subset of the model: there is no freezing of cells except for cells being edited instead of simply visualized. The GRCSM also supports user defined queries over arbitrarily nested data structures. There is no limit to the aggregation and nesting of data structures. Moreover, this functionality can be exercised over data that is frozen in time as well as live, making the GRCSM a tool suitable for real-time data visualization and transformation.

The GRCSM's supports programmable extensions that make possible to realize stateful computations over real-time data streams, like moving averages. Data streams may be connected to a GRCSM instance model via general (GRCC-based) or ad-hoc APIs.

For better performance, and to handle potentially large data sets, the GRCSM may provide two independent parallel processing capabilities:

- Each GRCSM instance, independently, may exploit suitable GPUs, if/when present and available, to provide single instruction multiple data (SIMD) vector processing capabilities. Implicit parallelization greatly simplifies the task for users.
- Multiple GRCSM instances can communicate with each other, as well as with other network connected devices, to form computing pipelines as well as arbitrary computational graphs. Each instance may act as a node in the graph, receiving inputs, performing calculations locally, and passing results to visualization clients or other computing nodes downstream.

Two general examples of implicit parallelization rules supported by the GRCSM are as follows:

Let op x be an expression such that x is of type array[ ]=>T and op is a unary prefix operator defined for operands of type T. If so, the GRCSM engine interprets the expression as [op x[0], . . . op x[n−1] ], where the x[i] are the elements of the x array.

Let x op y be an expression such that x is of type T1, y is of type array[ ]=>T2 and op is a binary operator that is defined for operands of type T1 and T2, in that order. Note that T1 and T2 need not be different. If so, the GRCSM engine interprets the expression as [x op y[0], x op y[n−1] ], where the y[i] are the elements of the y array.

The unary prefix operator and infix binary operator examples above can be trivially extended to unary and binary function applications of the form f(x) and f(x, y). Other forms of implicit parallelization are possible.

Examples log([1, 2, 3, 4]) is equivalent to [ log(1), log(2), log(3), log(4)]

2*[ 0, 1, 2, 3] is equivalent to [2*0, 2*1, 2*2, 2*3], which yields [0, 2, 4, 6]

Interconnecting multiple GRCSM instances to form arbitrarily complex computational graphs is made easy by the design of the GRCSM API, which largely includes statements and expressions written in the underlying GRCC. Computing graphs are a natural architecture for implementing process monitoring/control agents and reactive agents in general, as encountered in industrial settings like manufacturing, transportation, and energy production.

7.3 Statistical Modeling and Simulation Tool

The GRCSM provides a rich set of statistical functions and distribution-based random number generators, as well as integrated Monte Carlo capabilities, making it suitable for statistical/mathematical modeling and stochastic simulations, which are often used in science as well as in process optimization, demand planning, and quantitative finance.

7.4 Educational Tool

The interactive, visual programming, nature of GRCSM, combined with its wide range of capabilities, made possible by the flexible combination of a relatively small set of ingredients, makes it an ideal tool for teaching programming, ranging from basic (introductory) courses suitable for people with no previous exposure to programming, or even spreadsheets, to intermediate/advanced courses, like teaching higher order functional programming, computing with lazy expressions, and implementing algorithms that traverse arbitrarily nested data structures. It is also suitable for teaching statistics and how to implement stochastic simulations.

While the invention has been described with reference to the embodiments above, a person of ordinary skill in the art would understand that various changes or modifications may be made thereto without departing from the scope of the claims.

The invention claimed is:

1. A generalized reactive computing system and method (GRCSM) comprising:
   one or more generalized reactive computing system and method (GRCSM) servers holding a state of a computation model expressed in a generalized reactive computing code (GRCC),
   wherein variables are dynamically defined and added to the computation model via GRCC variable definition statements, wherein the variables are given a name and a type conformant to a GRCC type system, wherein:
   a) some of the variables are of a container type that include a plurality of independent variables,
   b) some of the variables are of a lazy type that is configured to hold expressions that are evaluated as needed,
   c) some of the variables are of a function type, able to hold function values,
   d) valid expressions in the computation model refer to variables in the computation model, and
   e) the state of a variable is changed via GRCC assignment; and
   one or more system elements (GRCSM clients), each of the GRCSM clients being capable of communicating with one or more GRCSM servers using the GRCC, wherein each GRCSM server allows, via a communications interface, other system elements to query the state of the computation model, subscribe to receive notifications about changes to the computation model, and alter the state of the computation model.

2. The GRCSM of claim 1, wherein one or more GRCSM clients are visual clients that connect to one or more GRCSM servers, wherein visual clients allow users to visualize, query, and alter the state of the GRCSM servers' computation models using a graphical user interface, wherein visual clients request to receive notifications about changes to computation models and render those changes visually on the graphical user interface.

3. The GRCSM of claim 2, wherein a visual client relies on one or more GRCSM servers to store a visualization model created by the user.

4. The GRCSM of claim 3, wherein the GRCSM servers provide APIs that provide the functions necessary to obtain a GRCSM model state and the visual clients query the APIs using GRCC expressions to render the model in the graphical user interface, and employ API functions to change the state of the model using GRCC assignments and subscribe to model change notifications.

5. The GRCSM of claim 3, wherein the GRCSM servers provide APIs that provide functions necessary to obtain a GRCSM model state and the command-line clients (REPL) query the APIs using GRCC expressions to report results in a shell window, and employ API functions to change the state of the model using GRCC assignments and subscribe to model change notifications.

6. The GRCSM of claim 1, wherein the lazy type variable stores a result of computing an expression for reuse and automatically re-compute the result of the expression when changes to the state of the computational model affect the result of the expression.

7. The GRCSM of claim 1, wherein the computational model includes array variables that have one, two, or more dimensions, wherein each array variable holds an arbitrary number of values or expressions of the same type.

8. The GRCSM of claim 7, wherein a size of an array can changes during a lifetime of the array variable.

9. The GRCSM in claim 7, wherein formulae refer to elements of two-dimensional arrays using subscript notation and A1 notation, which renders 2D arrays of variant elements compatible with traditional worksheets.

10. The GRCSM of claim 1, wherein some container variables in the computation model are tuples that are composite variables with an arbitrary number of component variables, wherein said component variables are of different type.

11. The GRCSM of claim 1, wherein some container variables in the computation model are structs that are composite variables wherein each component variable includes a field name.

12. The GRCSM of claim 1, wherein each variable or component therein are defined as strictly having a given type over its entire lifetime or be able to hold values and/or expressions of different type over a variable's entire lifetime.

13. The GRCSM of claim 1, wherein system elements deduce a type of a named variable based on the expression used to initialize the named variable.

14. The GRCSM in claim 1, wherein the system elements allow redefinitions of named variables that fail a consistency check, as well as un-defining variables.

15. The GRCSM of claim 1, wherein the system element provides predefined stochastic functions that yield different pseudo-random values even when applied to the same arguments, wherein such values conform to a statistic distribution.

16. The GRCSM of claim 1, wherein a system element is instructed to re-compute a computation model an arbitrary number of times and capture summarizing statistics and a representation of a distribution of stochastic variables, which are variables associated with formulae that depend on predefined, or user-defined, stochastic functions.

17. The GRCSM of claim 1, wherein the system element binds one or more computation model variables to live data streams that allow system elements to monitor live data feeds in near real-time.

18. The GRCSM of claim 1, wherein system elements communicate with other system elements, via GRCC, subscribing to computation model state updates, and sending GRCC commands to change the state of the computation model.

19. The GRCSM in claim 1, wherein one or more visual clients allow one or more users to visualize, navigate, and edit computational models, concurrently, while interacting with the computational model in a spreadsheet-like manner.

20. The GRCSM of claim 19, wherein the visual client contains a variable panel and zero, one, or more view panels, wherein the variable panel allows users to browse names of the named variables in the computational model, and each view panel allows users to navigate, visualize, and edit multiple computational model variables or arbitrary expressions.

21. The GRCSM in claim 19, wherein a visual client allows a user navigate arbitrarily nested composite variables, zooming in and out of associated components.

22. The GRCSM in claim 1, where one or more GRCSM clients are read-eval-print-loop (REPL) clients that connect to one or more GRCSM servers, wherein said REPL clients allow users to query and alter the state of the corresponding computation models using a command line interface, wherein said REPL clients request to receive notifications about changes to computation models sending said notifications to shell windows.

23. A generalized reactive computing system and method (GRCSM) comprising:
one or more generalized reactive computing system and method (GRCSM) servers, wherein each GRCSM server consists of a virtual machine (VM) wrapped by a communications interface layer that allows other systems to interact with the GRCSM server;
wherein the VM implements a generalized reactive computing code (GRCC), which describes the state of a computation model and provides instructions to compute expressions in the model and change the state of the model;
wherein variables are dynamically defined and added to the computation model via GRCC variable definition statements,
wherein the variables are given a name and a type conformant to a GRCC type system, wherein:
a) some of the variables are of a container type that include a plurality of independent variables,
b) some of the variables are of a lazy type that is configured to hold expressions that are evaluated as needed,
c) some of the variables are of a function type, able to hold function values,
d) valid expressions in the computation model can refer to variables in the computation model, and
e) the state of a variable is changed via GRCC assignment; and
wherein one or more system elements (GRCSM clients) communicate with one or more GRCSM servers, using GRCC;
wherein each GRCSM server allows, via its communications interface, other system elements to query the state of the computation model, subscribe to receive notifications about changes to the computation model, and alter the state of the computation model.

* * * * *